(12) United States Patent
Fuchs

(10) Patent No.: US 8,183,814 B2
(45) Date of Patent: May 22, 2012

(54) ALTERNATING CURRENT MACHINE WITH INCREASED TORQUE ABOVE AND BELOW RATED SPEED FOR HYBRID ELECTRIC PROPULSION SYSTEMS

(76) Inventor: Ewald Franz Fuchs, Boulder, CO (US)

( * ) Notice: Subject to any disclaimer, the term of this patent is extended or adjusted under 35 U.S.C. 154(b) by 463 days.

(21) Appl. No.: 12/508,093

(22) Filed: Jul. 23, 2009

(65) Prior Publication Data

US 2010/0019714 A1 Jan. 28, 2010

Related U.S. Application Data

(60) Provisional application No. 61/135,788, filed on Jul. 24, 2008.

(51) Int. Cl.
*H02P 1/00* (2006.01)
(52) U.S. Cl. .......... 318/524; 318/798; 318/721
(58) Field of Classification Search ......... 318/524, 318/184, 721, 798, 810, 808, 400.02, 801, 318/807, 503, 400.09; 310/156.08
See application file for complete search history.

(56) References Cited

U.S. PATENT DOCUMENTS

| | | | |
|---|---|---|---|
| 3,601,642 A * | 8/1971 | Willyoung | 310/98 |
| 4,220,881 A | 9/1980 | Hamilton et al. | |
| 4,949,023 A | 8/1990 | Shlien | 318/541 |
| 5,142,213 A | 8/1992 | Stelter | 318/771 |
| 5,714,821 A | 2/1998 | Dittman | 310/179 |
| 5,764,036 A * | 6/1998 | Vaidya et al. | 322/90 |
| 6,242,884 B1 | 6/2001 | Lipo et al. | |
| 6,404,152 B1 * | 6/2002 | Kobayashi et al. | 318/400.23 |
| 6,710,495 B2 | 3/2004 | Lipo et al. | |
| 6,906,479 B2 | 6/2005 | Xu et al. | 318/140 |

OTHER PUBLICATIONS

Fuchs, E. F. et al., "A New Computer-Aided Method for the Efficiency Measurement of Low-Loss Transformers and Inductors Under Nonsinusoidal Operation," *IEEE Transactions on Power Delivery*, vol. 11, No. 1, pp. 292-304 (Jan. 1996).
Fuchs, E. F. et al., "Analysis of an Alternator with Two Displaced Stator Windings," *IEEE Transactions on Power Apparatus and Systems*, vol. PAS-93, No. 6, pp. 1776-1786 (Nov. 1974).
Pollack J. J., "Advanced Pulsewidth Modulated Inverter Techniques," *IEEE Transactions on Industry Applications*, vol. IA-8, No. 2, pp. 145-154 (Mar./Apr. 1972).
Fuchs, et al., *Analysis of Critical-Speed Increase of Induction Machines Via Winding Reconfiguration With Solid-State Switches*, IEEE Transactions on Energy Conversion, vol. 23, No. 3, pp. 774-780 (Sep. 2008).
Fuchs, et al., *Power Quality in Power Systems and Electrical Machines*, Academic Press, pp. 118-119 (2008).
Huang, et al., *High-Power Density and High-Efficiency Motors for Electric Vehicle Applications*, ICEM, Massachusetts Institute of Technology, Cambridge, MA, (Aug. 13-15, 1990).

(Continued)

*Primary Examiner* — Karen Masih
(74) *Attorney, Agent, or Firm* — Greenberg Traurig, LLP

(57) ABSTRACT

The machine in accordance with the present disclosure is an AC machine whose pole numbers can be switched (from pole $p_1$ to pole $p_2$), and whose number of series turns per phase N can be switched say from $N_0=N_{rated}$ to $N_1=N_0/2$. Furthermore, it employs an inverter so that the frequency can be changed from a low value (e.g., 5 Hz) to a high value (e.g., 200 Hz). Due to the combination of pole number and number of series turns switching/reconfiguration, a high torque at low speed (e.g., 0 rpm) and a high torque at high speed (e.g., 5,000 rpm) can be achieved, making mechanical gears obsolete. In addition, the output power of the motor can be increased at high speed in direct proportion to the speed increase.

17 Claims, 25 Drawing Sheets

OTHER PUBLICATIONS

Schraud, et al., *Experimental Verification of Critical-Speed Increase of Single-Phase Induction Machines Via Winding Reconfiguration With Solid-State Switches*, IEEE Transactions on Energy Conversion, vol. 23, No. 2, pp. 460-465 (Jun. 2008).

van der Giet, et al., *Induction Motor with Pole-Changing Winding for Variable Supply Frequency*, Electric Machines & Drives Conference, vol. 2, pp. 1484-1489 (May 3-5, 2007).

* cited by examiner

ALTERNATING CURRENT MACHINE WITH INCREASED TORQUE ABOVE AND BELOW RATED SPEED FOR HYBRID ELECTRIC PROPULSION SYSTEMS

RELATED APPLICATIONS

This application claims the benefit of priority of U.S. Provisional Patent Application No. 61/135,788, filed Jul. 24, 2008 entitled "Alternating Current Machines With Increased Torque (Larger Than Rated Torque) Above And Below Rated Speed For Hybrid/Electric Propulsion Applications".

FIELD OF THE DISCLOSURE

The present disclosure relates to electric motors and generators. In particular, it relates to systems and methods for operating such machines above, at, and below rated machine speed and torque, and for operating at multiples of rated speed, at rated torque, by compensating for flux weakening.

BACKGROUND OF THE DISCLOSURE

Electric drives require for starting (below rated speed), a torque which is a multiple of the rated torque, and for higher speeds (above rated speed), an increased torque. While the first one is required to guarantee a smooth start-up, the latter is desirable to warrant sufficient acceleration torque to improve dynamic performance. It is well known that speed control—based on (V/f) control—results in a decreasing torque above rated operation ($T_{rated}$, $n_{m\_rated}$).

Rated speed is the maximum speed that an electric motor can run at, while also running at a rated torque, continuously for a significant period of time without damaging the motor. Rated torque is the maximum torque that an electric motor can produce continuously for a significant period of time without damaging the motor.

SUMMARY OF THE DISCLOSURE

The present disclosure relates to systems, method, and apparatus for achieving greater than rated operating conditions (e.g., speed, torque, power) in a multiphase electric machine. The machine achieves greater than rated operating conditions by changing the number of poles and by switching the number of series turns (or inductance) of each phase belt.

In one aspect, a multiphase inductance-changing and pole-changing electric machine operable at above rated parameters may have a stator having a plurality of phase belts, wherein each phase belt comprises two or more coils, a rotor driven by currents in the stator, and a control system connected to the plurality of phase belts. Each of the two or more coils in a phase belt are initially connected in series. The control system may be configured to apply an alternating current to the plurality of phase belts at a first time and at a frequency equal to a first frequency. The first frequency may be below a rated frequency (the frequency at which the machine can operate continuously without overheating or experiencing any permanent damage). The control system may be configured to increase the frequency to a second frequency during a time period spanning the first time and a second time. The control system may be configured to decrease the number of poles at a third time. The control system may be configured to increase the frequency to a third frequency during a time period spanning a fourth and a fifth time. The control system may be configured to decrease the inductance of the plurality of phase belts at a sixth time. The control system may be configured to increase the frequency to a fourth frequency during a time period spanning a seventh time and an eighth time.

In one aspect, decreasing the number of poles may be accomplished by switching the series connections between phase belts to parallel connections. In one aspect, the time period spanning the fourth and fifth time periods may be minimized without saturating the machine. In one aspect, decreasing the inductance of the phase belts may be accomplished by switching the series connection(s) between two or more coils in each phase belt to parallel connections. In one aspect, the phase belts may be initially connected in a delta configuration. To decrease the number of poles, the delta configuration may be switched to a double wye configuration. In one aspect, the phase belts may initially be connected in a double wye configuration. To decrease the number of poles, the double wye configuration may be switched to a delta configuration. In one aspect, the phase belts may initially be connected in a wye configuration. To decrease the number of poles, the wye configuration may be switched to a double wye configuration. In one aspect, the second frequency may equal the rated frequency. In one aspect, the second time may equal the third time. In one aspect the fifth time may equal the sixth time.

In one aspect, a multiphase inductance-changing and pole-changing electric machine operable at above rated parameters may have a stator having a plurality of phase belts, wherein each phase belt comprises two or more coils, a rotor driven by currents in the stator, and a control system connected to the plurality of phase belts. Each of the two or more coils in a phase belt may initially be connected in series. The control system may be configured to increase the frequency of an alternating current applied to the plurality of phase belts during a first time period. The control system may be configured to decrease a number of poles in the stator at a second time. The control system may be configured to further increase the frequency of the alternating current applied to the plurality of phase belts during a second time period. The control system may be configured to decrease an inductance of the plurality of phase belts at a third time. The control system may be configured to further increase the frequency of the alternating current applied to the plurality of phase belts during a third time period.

In one aspect, the second time period may follow the second time (meaning it does not start at the second time, but starts after the second time). In one aspect, the third time period may follow the third time.

In another aspect, a method is disclosed for operating an alternating current machine at above rated parameters. The method may include increasing the frequency of an alternating current applied to a plurality of stator phase belts during a first time period. The method may include decreasing the number of poles in the stator at a second time. The method may include further increasing the frequency of the alternating current applied to the stator phase belts during a second time period. The method may include decreasing the inductance of the plurality of stator phase belts at a third time. The method may include further increasing the frequency of the alternating current applied to the plurality of stator phase belts during a third time period. In one aspect, the second time period may follow the second time. In one aspect, the third time period may follow the third time.

A machine and method for operating an alternating current machine below and above rated speed and torque is disclosed. Such a drive using (V·p/f·N) control—as taught by this disclosure, where $V \leq V_{rated}$ and $N \leq N_{rated}$—with increased torque and speed operation without increasing the machine size or weight but increasing the output power rating (e.g., by a factor of two) will find applications in the area of hybrid and electric drives for automobiles, military vehicles, and wind power plants, just to name a few. The principle for this extended operating range is based on 1) pole-changing techniques and 2) changing/switching the number of series turns per phase N of an alternating current/voltage machine via electronic switches or relays and the use of an inverter/rectifier supplying/absorbing power to/from the electric machine when operated as a motor/generator.

The machine in accordance with the present disclosure is an AC machine whose pole numbers can be switched (e.g., from pole $p_1$ to pole $p_2$), and whose number of series turns per phase belt N can be switched say from $N_0=N_{rated}$ to $N_1=N_0/2$. Furthermore, it employs an inverter so that the frequency can be changed from a low value (e.g., 5 Hz) to a high value (e.g., 200 Hz). The high number of poles at low speed (e.g., near 0 rpm) provides high torque during starting. In order to reach higher speeds, the number of poles can be decreased and, shortly thereafter (e.g., one second), the number of windings per pole can be decreased (increasing flux density and compensating for flux weakening). This decrease in the number of turns per pole provides torque that is greater than is possible using conventional (V/f) control at high speed (e.g., 5,000 rpm). In addition, the output power of the motor can be increased (e.g., by a factor of two) at high speed in direct proportion to the speed increase. This combination of high starting pole number, decreased pole number, and then decreased number of windings per pole obviates the need for mechanical gears.

The reconfiguration of the stator winding requires significantly more than 6 switches. During transient operation the flux density within the machine can be increased above its rated value. While traditional (V/f) control can only achieve speeds around three times the rated or base speed, the (V·p/f·N) control, herein disclosed, can achieve output power at least six times the rated or base speed. The present disclosure can also increase output power by at least a factor of two over traditional (V/f) control. The machine as proposed by this disclosure can work both as a motor and as a generator at variable speed, due to the pole and number of turns switching and the inverter supplying currents/voltages at variable frequency.

The use of pole-changing and number of turns changing supplant mechanical gears, thus requiring less space, causing less loss, and resulting in less weight than systems using mechanical gears.

In one exemplary embodiment, the start-up time from 0 rpm to more than 4 times the base speed may be not more than a few seconds. In some embodiments, the inverter input power may be supplied by a battery or another power source. The efficiency either as a motor or an alternator in various embodiments may be in the 75-95% range depending upon the output power rating of the variable-speed drive in accordance with this disclosure.

DETAILED DESCRIPTION

Reference will now be made in detail to the accompanying drawings, which at least assist in illustrating various pertinent embodiments and aspects of the present disclosure. The presently disclosed electric machine can be used as a motor fed by an inverter, or generator feeding a rectifier.

Figure 20:
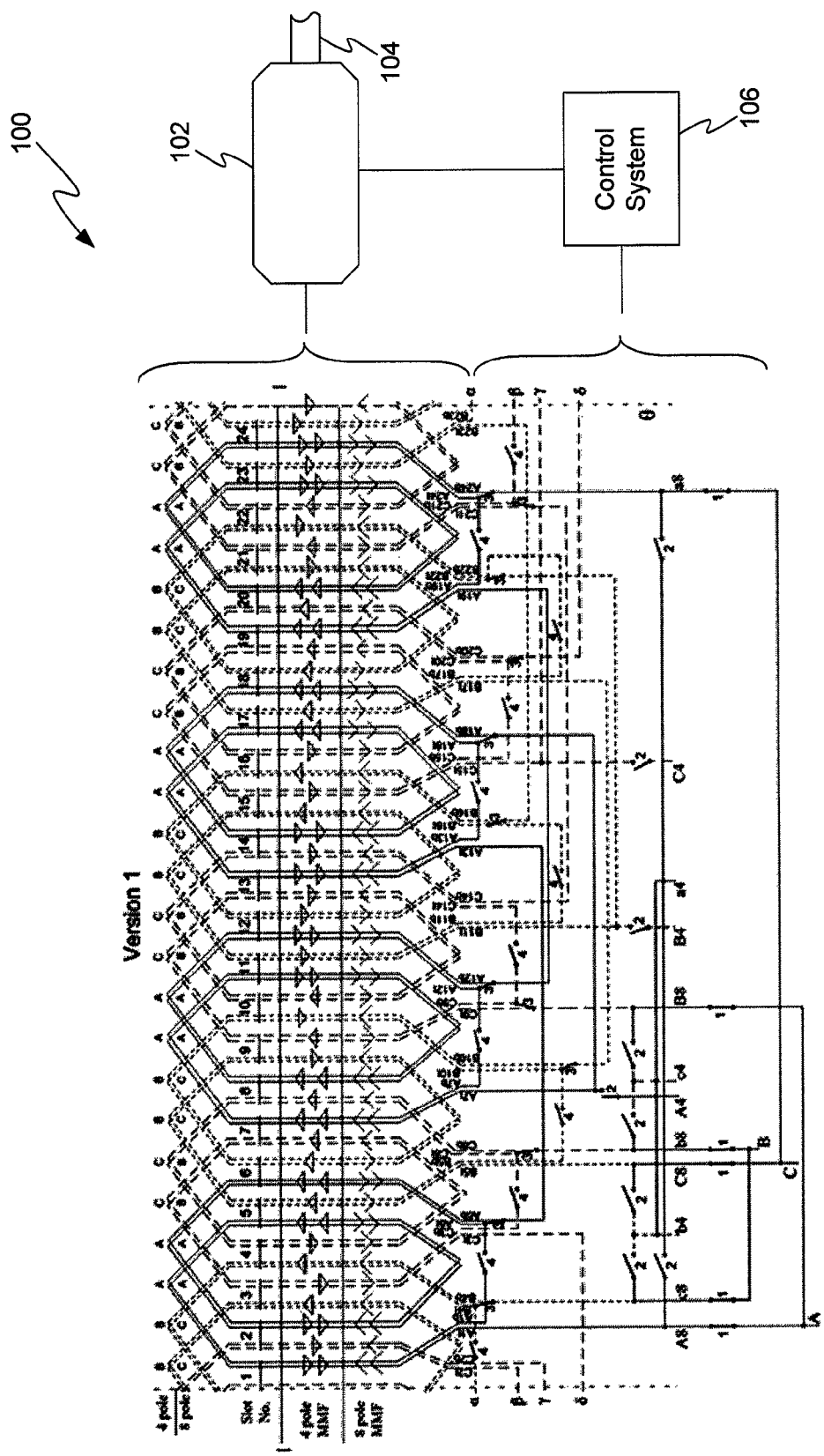
FIG. 20 illustrates a second view of the winding configuration illustrated in FIG. 19.

For the purposes of this disclosure, an electric machine 100, as shown in FIG. 20, comprises a stator 102 and a rotor 104, where the stator is stationary, and alternating currents (AC) in phase belts of the stator drive the rotor to rotate (in the case of a wind turbine or in a car configured to generate energy from braking the rotor turns and generates currents in the stator). When an alternating current (AC) is passed through the phase belts of the stator, the changing current induces a magnetic field that inductively couples to the rotor. For the purposes of this disclosure, the rotor is a rotating armature of a motor or generator. The rotor has either electrically-conductive elements, at least one permanent magnet, or neither electrically-conductive elements nor at least one permanent magnet. The stator has multiple poles, each formed from two or more electromagnets. The magnitude of current passed through each electromagnet varies in time so as to create a rotating magnetic field. If the rotor has a permanent magnet, then the rotating magnetic field drives the permanent magnet of the rotor to rotate and thus rotate a shaft that can be connected to the wheels of an engine or the blades of a wind turbine, for example. If the rotor has conductive elements, but no permanent magnet (e.g., squirrel cage configuration), the rotor's conductive elements cut through the magnetic flux generated by the stator and induce currents in the rotor. These currents generate magnetic fields that effectively replicate the permanent magnet of the permanent magnet-style rotor. The rotating magnetic field of the stator then drives the rotor to rotate and again this rotates a shaft that can be used to drive an engine (or when used in reverse can be used to generate electrical power).

For the purposes of this disclosure, a stator is a mechanical device consisting of the stationary part of a motor or generator in or around which the rotor revolves. The stator includes a plurality of stator slots. Stator slots are radially-oriented cuts or openings in the stator in which portions of the phase belts reside. The pieces of stator between stator slots are herein referred to as teeth.

For the purposes of this disclosure, a "phase belt" is one or more turns of conductive wire that pass through a pair of slots. A phase belt is also known as an inductor or an induction coil. The ends of the wire in a phase belt, referred to as "leads," can be connected to the leads of other phase belts, to a control system, or to both. For instance, one lead of a phase belt may be connected to the control system while the other lead is connected to the lead of another phase belt. The stator teeth are made from magnetically permeable material (e.g., iron or steel) and thus enhance the magnetic field that is formed when current passes through a phase belt.

A phase belt may comprise a single conductive wire or two or more conductive wires. Each continuous conductive wire will be referred to as a coil. If there are two or more coils in a phase belt, then the two or more coils can be connected in series or in parallel. When connected in series any number of coils act as if the phase belt were made of a single conductive wire. The total inductance of the phase belt, $L_{total}$, is the sum of the inductance of the coils ($L_1, L_2, \ldots, L_n$).

$$L_{total} = L_1 + L_2 + \ldots + L_n$$

Thus the inductance of a phase belt comprising either a plurality of coils connected in series or a phase belt comprising a single coil is $L_{total}$.

However, if any two or more of the coils are connected in parallel, then the phase belt's total inductance decreases. This effect is the same as summing the total inductance of discrete inductors connected in parallel.

$$L_{total} = \frac{1}{\frac{1}{L_1} + \frac{1}{L_2} + \ldots + \frac{1}{L_n}}$$

As seen, when coils are connected in parallel, the total inductance for the phase belt decreases.

Since the inductance of an inductor is proportional to the number of turns in that inductor, changing the number of turns and changing the inductance of an inductor achieve the same goal—changing the magnetic flux that can be produced (or absorbed) by a given inductor. Thus, for the purposes of this disclosure changing the inductance and changing the number of turns will be used interchangeably. For the purposes of this disclosure, when reference is made to a change in inductance or the change in the number of turns, what is meant is that two or more coils in a phase belt are switched from series connections to parallel connections (or vice versa). In one embodiment, inductance can be altered by switching series connections between phase belts, in a given phase, to parallel connections.

For purposes of this disclosure, a "turn" means a single wrap or loop of conductive wire. A coil comprises one or more turns.

For the purposes of this disclosure, a "winding" means all phase belts in an electric machine. Winding will be used to refer to all phase belts in all phases together. For instance, if there are three phases, and four phase belts per phase, then the winding includes all twelve phase belts and all connections between those phase belts.

A magnetic pole is a region at each end of a permanent magnet where the external magnetic field is strongest (the strongest magnetic field is actually internal to the permanent magnet). Electromagnets also have poles. An electromagnet has a similar magnetic field to a permanent magnet, but is formed by passing current through a plurality of conductive coils (e.g., a phase belt). For the purposes of this disclosure, an electromagnet may comprise one or more phase belts. For instance, an electromagnet may be one or more phase belts connected in series or parallel and positioned in the same two stator slots. Alternatively, an electromagnet may be a plurality of phase belts connected in series or parallel and positioned in four or more stator slots. Like the permanent magnet, the strongest field in an electromagnet is found within the bounds of the coils. The "external" magnetic field is thus completely outside the bounds of the coils.

For purposes of this disclosure, a pole means one end of an electromagnet or group of phase belts having the same polarity. Each electromagnet so formed has a single pole pair (North and South). For instance, the North pole of a first phase belt and the South pole of a second phase belt positioned opposite to the first phase belt in a stator form a single pole pair. The number of poles can be changed by switching the phase belts from series to parallel connections and vice versa. Thus, when referring to pole changes herein, what is meant is changing the number of pole pairs in the stator configuration being described.

For the purposes of this disclosure, a control system or controller 106, shown in FIG. 20 may include one or more hardware components or software components operating on a computer system. The control system 106 may be configured to control a voltage or current source and the switching network, both of which are connected to the stator phase belts.

The control system controls not only the current and/or voltage applied to the phase belts, but also the frequency at which the current and/or voltage is applied to the phase belts. The control system also controls the switches which control how the coils are connected to each other and how the phase belts are connected to each other. In other words, the control system controls the number of poles and the number of turns per phase belt.

To summarize, this disclosure describes an electric machine using a large number of poles at low speeds to generate a large flux. Once the machine has begun to rotate, or shortly thereafter, the number of poles can be decreased. Once the number of poles have been decreased the speed can be ramped up further. However, shortly after the number of poles have been decreased, the number of turns per phase belt can be decreased. This switch to a lower number of phase belts should preferably occur immediately after the number of poles has been changed. However, to avoid saturating the machine, the number of turns should be decreased at least one second after the number of poles has been decreased.

Basic Principle of (V/f·N) and (V·p/f) Control

The induced voltage E of an alternating current electric machine (either motor or generator) is related to the rated maximum flux density $B_{max}$, the rated number of series turns per phase belt $N_{rated}$, the radius of the location of the stator phase belts R, the active (core) machine length L, the frequency of the voltages/currents f, and the pole number p by:

$$E = 4.44 \cdot f \cdot B_{max} \cdot N_{rated} \cdot 4 \cdot R \cdot L/p.$$

Rated values are those values at which the machine can continuously operate at without overheating.

For rated induced voltage $E_{rated}$ the frequency f and the maximum flux density assume rated values. If $E<E_{rated}$ then the flux density is less than its rated value, and for $E>E_{rated}$ the flux density will be above its rated value. The latter case should not be maintained for sustained time periods as overheating can damage the machine. The following relation describes steady-state operation when $E \leq E_{rated}$ and $f \leq f_{rated}$:

$$\frac{E}{f} = 4.44 \cdot B_{max} \cdot N_{rated} \cdot 4 \cdot R \cdot L / p = \text{constant}$$

For $f > f_{rated}$ the induced voltage can be at the most $E = E_{rated}$ and the flux density will be less than its rated value, called flux weakening operation. For operation above rated speed, where $f > f_{rated}$, the induced voltage E can be replaced in the above formulas by the terminal voltage V resulting in (V/f) control. By changing the number of series turns per phase N and the pole number p of the machine the flux weakening can be compensated for and the machine can be operated at up to the rated flux density above rated speed. This results in superior performance (e.g., increased torque and increased power).

Figure 1:
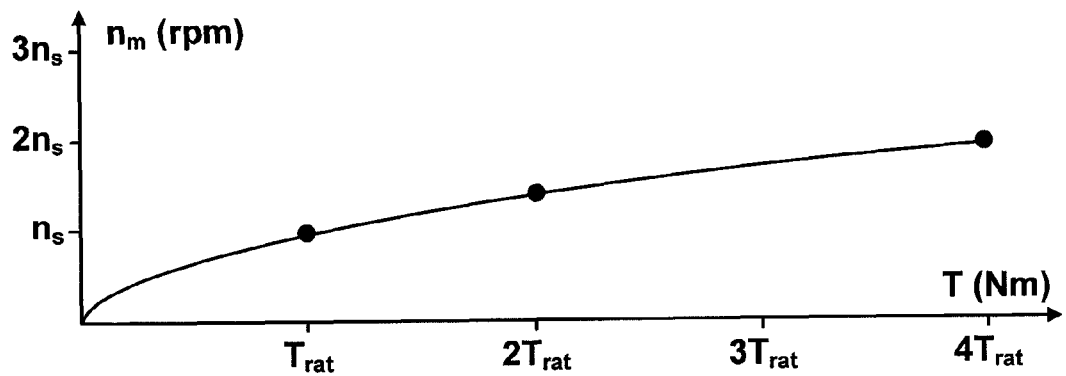
FIG. 1 shows a torque-speed characteristic of a wind turbine $T \propto n_m^2$.
Figure 2:
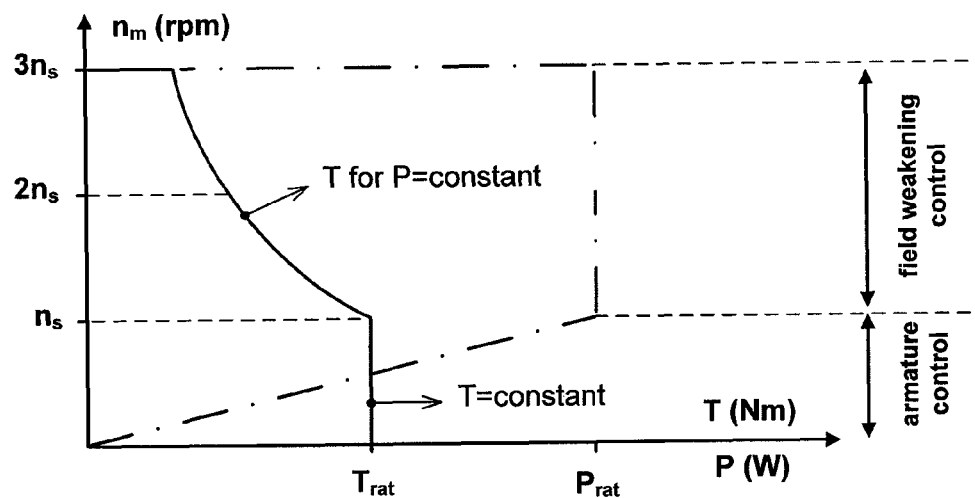
FIG. 2 shows a torque-speed characteristic of an electric motor at speeds from zero to three times rated speed ($3n_s$).

For example, it is well-known that the torque-speed characteristic of wind turbines (see FIG. 1) and commonly available variable-speed generators employing flux (field) weakening (see FIG. 2) do not match because the torque of a wind turbine is proportional to the square of the speed, and the torque of a variable-speed generator is inversely proportional to the speed in the field-weakening region. The same applies to variable-speed drives (motors/generators) of hybrid/electric cars where the critical (maximum) speed is limited by the reduction (from flux weakening) of the developed torque, resulting in less than the rated output power. One way to mitigate this mismatch is to electronically change the number of poles p, or to change the number of series turns per phase belt N (e.g., via an application specific integrated circuit ("ASIC")). The change in the number of poles p can be described by the following relation:

$$\frac{E \cdot p}{f} = 4.44 \cdot B_{max} \cdot N_{rated} \cdot 4 \cdot R \cdot L$$

where $B_{max}$ is the rated maximum flux density at the radius R of the machine, $N_{rated}$ is the rated number of series turns per phase belt, and L is the axial iron-core length of the machine.

Preferably, the maximum flux density $B_{max}$ of the machine at any operation (e.g., start-up, variable-speed operation, regenerative braking) should be within the range $0.3T \leq B_{max} \leq 1.1T$. On the one hand, if $B_{max}$ is too small, the torque will be reduced to an unacceptable low level, the machine operation may be sluggish and the desired speeds and torques might not be obtained. On the other hand, if $B_{max}$ is too large, the machine saturates and the losses will become too large.

The change of the number of series turns per phase N can be described by the following relation:

$$\frac{E}{f \cdot N} = 4.44 \cdot B_{max} \cdot 4 \cdot R \cdot L / p.$$

One can see that decreasing the number of series turns per phase N enables a higher frequency without decreasing the flux density (e.g., rated flux density $B_{max}$). Hence, decreasing N compensates for flux weakening (i.e., flux density can remain constant while frequency is increased past the frequency at which flux weakening would normally set in). The change of p will similarly affect this (E/f) relationship. For example, adding this degree of freedom will permit wind turbines to operate under stalled conditions at all speeds, generating the maximum possible power at a given speed with no danger of runaway. This will simplify the mechanics and control of blade-pitch.

Recall that decreasing the number of series turns per phase N is equivalent to decreasing phase belt inductance. In one embodiment, where a phase belt comprises two or more coils, this can be accomplished by changing the series connections between the coils to parallel connections. In another embodiment, this can be accomplished, by changing the series connections between phase belts, to parallel connections.

Figure 3:
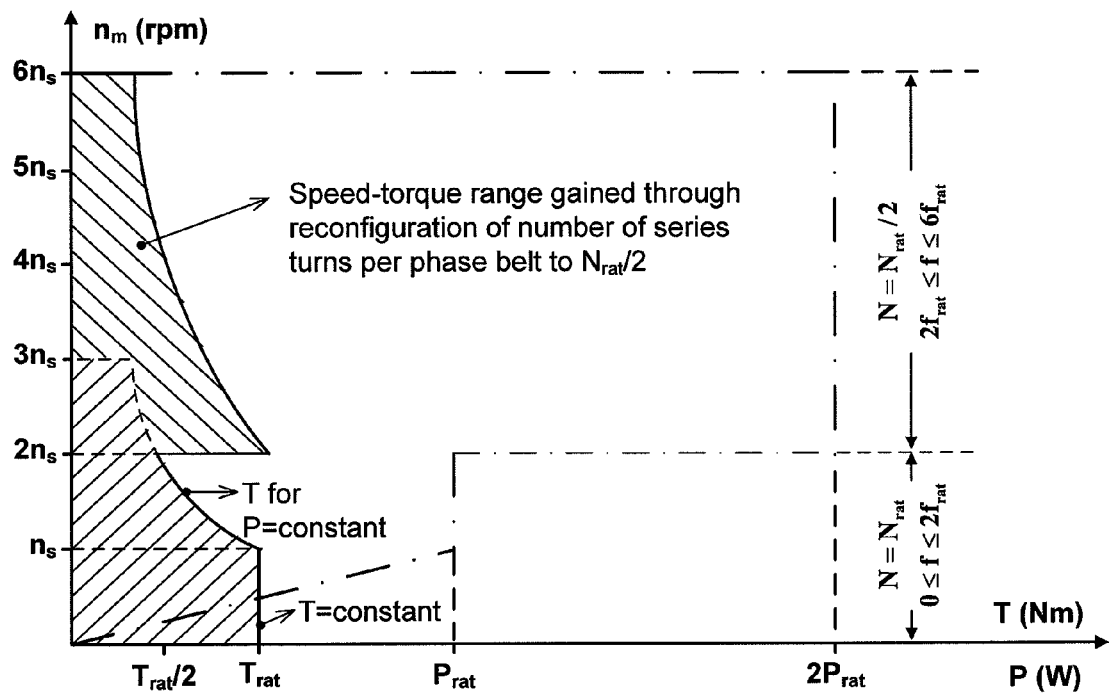
FIG. 3 shows a torque-speed characteristic of an electric motor at speeds from zero to six times rated speed ($6n_s$) and taking advantage of the increased torque resulting from a reduction in the number of turns (e.g., $N_{rated}$ to $N_{rated}/2$) at speeds above $2n_s$.

FIG. 3 shows a torque-speed characteristic of an electric motor at speeds from zero to six times rated speed ($6n_s$) and taking advantage of the increased torque resulting from a reduction in the number of turns (e.g., $N_{rated}$ to $N_{rated}/2$) at speeds above $2n_s$. The number of stator turns per phase belt can be denoted as N. An initial number of stator turns per phase belt is $N_0$. In FIG. 3 speed (revolutions per minute (rpm) or rotational velocity) of the machine is plotted on the y-axis and is denoted $n_m$. Torque (T) and power (P) are plotted on the x-axis. In the illustrated characteristic, as the machine accelerates from a speed of zero to the rated speed, $n_s$, the torque is constant and is equal to the rated torque, $T_{rat}$. This avoids exceeding the rated current. However, when the speed exceeds the rated speed, $n_s$, the torque begins to decrease as field weakening takes effect. At twice the rated speed, $2n_s$, the number of stator turns is halved from $N_0$ to $N_0/2$. This decrease in the number of turns increases the flux density associated with the phase belts and thus compensates for the flux weakening. As a result the torque doubles from $T_{rated}/2$ to $T_{rated}$. As the machine continues to accelerate the torque again decreases due to flux weakening. However, despite this decrease, the torque is still greater than it would be were the original number of turns, $N_0$, still being used.

Moreover, when torque decreases to a certain point, acceleration is no longer possible. For instance, at $3n_s$ with the original number of turns, $N_0$, the torque goes to $T_{rated}/3$, and hence the engine cannot accelerate very well above $3n_s$ because the torque falls below $T_{rated}/3$ (although it appears that torque goes to zero at $3n_s$ and again at $6n_s$, this is just an industry convention, and in reality the hyperbolic curves continue to extend to higher speeds). Thus, an added advantage of the increased torque due to reducing the number of turns is that sufficient torque (e.g., twice the torque) is generated at high speeds (e.g., above $3n_s$) enabling the machine to accelerate beyond the top, or critical, speed (e.g., $3n_s$) of the machine using the original number of turns $N_0$ to an increased critical speed (e.g., $6n_s$).

It should be understood that the values used in FIG. 3 are non-limiting. For instance, the starting torque is not limited to the rated torque, $T_{rat}$. The curvature of the flux weakening regions is also illustrative rather than limiting. The number of turns can be decreased at any point, not just at $2n_s$. However, preferably the number of turns is decreased at speeds above where flux weakening sets in. The decrease in the number of turns also can be any fraction not just one half. Finally, while FIG. 3 only shows a characteristic wherein the number of turns is decreased a single time, in other embodiments the number of turns can be decreased more than one time in order to compensate for flux weakening.

Figure 4:
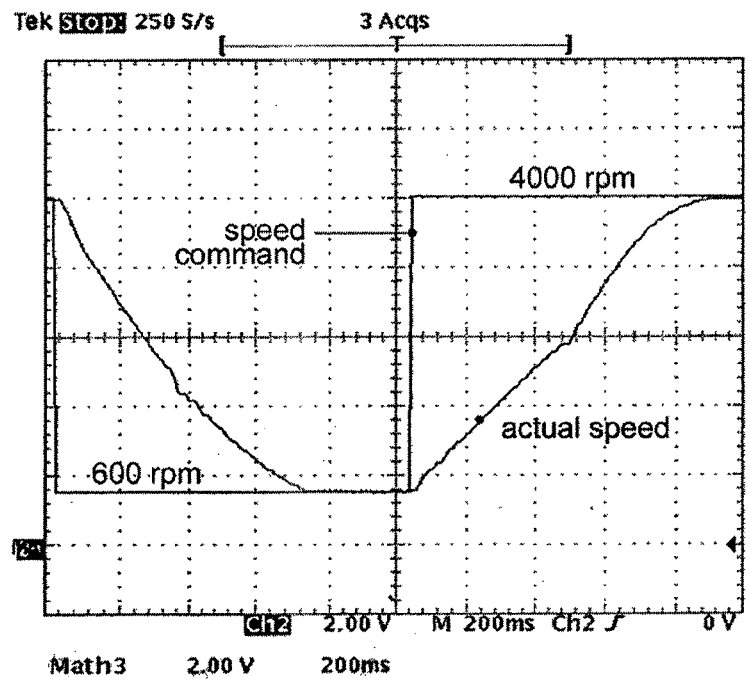
FIG. 4 shows a plot of measured electric motor drive speed (y-axis) in terms of time (x-axis) with a pole number change from $p_1$ to $p_2$ and from $p_2$ to $p_1$ (one horizontal division corresponds to 200 ms; one vertical division corresponds to 800 rpm).

FIG. 4 shows a plot of measured electric motor drive speed (y-axis) in terms of time (x-axis) with a pole number change from $p_1$ to $p_2$ at and from $p_2$ to $p_1$ (one horizontal division corresponds to 200 ms; one vertical division corresponds to 800 rpm). This figure shows experimental verification that the change in pole numbers does not interrupt the smooth deceleration (left half of plot) or smooth acceleration (right half of plot). At 0 s the machine is instructed to run at 4000 rpm. At around 20 ms the machine is instructed to run at 600 rpm. The actual speed gradually decreases until shortly before 400 ms where the pole number is switched from $p_2$ to $p_1$. The speed smoothly decreases through this transition point and continues until it bottoms out at 600 rpm. The machine is then instructed to run at 4000 rpm at approximately 1.02 s. The actual speed gradually increases until around 1.5 s where the pole number is changed from $p_1$ to $p_2$. The speed smoothly increases through this transition point and continues until it tops out at 4000 rpm.

Overall Design Approach

An alternating current (I) at a voltage (V) is passed through the phase belts at a frequency f. The voltage can be measured between the lines, or terminals, of the machine rather than between one line and ground. Such a measurement is referred to as line-to-line voltage and is labeled $V_{line-line}$. To increase the speed of the machine the frequency f of the current or voltage applied to the phase belts is increased. This generates a torque T and a power P. The result is that the machine rotates at a speed n (also known as rotational velocity or revolutions per minute (rpm)). The rated value of any of these is the value that the machine can be operated at for extended periods of time (steady-state) without the machine overheating or being permanently damaged.

The machine can be an induction machine, a synchronous machine, a permanent-magnet machine, a switched-reluctance machine, a homopolar machine, or a brushless DC machine. In one embodiment, the pole number is changed at low speeds while the number of turns is changed at high speeds. Increasing the pole number increases torque at low speed (around 0 rpm). A decrease in the pole number will result in the machine increasing speed without an increase in the frequency of the current or voltage which is applied to the phase belts. It puts the machine into a different operating region wherein an increase in the frequency f generates more torque than the increase in frequency would generate with a larger number of turns. Decreasing the number of turns increases the flux density and thus the torque.

The rated torque $T_{rated}$ and the base speed $n_{base}$ can be derived as follows. Without changing the pole number or number of turns the maximum torque $T_{max}$ for frequencies $f \leq f_{rated}$ is written as:

$$T_{max} = \pm \frac{3}{2\omega_{ms}} \frac{|\tilde{E}_{rated}|^2}{X'_r},$$

where the synchronous mechanical angular velocity is:

$$\omega_{ms} = \omega/(p/2) = 2\pi f/(p/2),$$

and a rotor leakage reactance can be written as follows:

$$X'_r = \frac{m \cdot (p/2)}{N_r}(2N_s \cdot \varsigma_s)^2 \cdot 1.58 \cdot f \frac{1}{p}(\Lambda_{slotr} + \Lambda_{endr} + \Lambda_{diffr})[\Omega],$$

where m is the number of stator phases, p is the number of poles, f is the frequency at which the voltage/current is applied to the turns, $N_s$ is the number of turns per phase belt, $\varsigma_s$ is a stator turns factor, and $N_r$ is the number of rotor phases (bars). $\Lambda_{slotr}$, $\Lambda_{endr}$, and $\Lambda_{diffr}$ are the rotor slot, rotor end region, and rotor differential permeances of the rotor leakage, respectively. While the dominant part, the slot leakage, is independent of p, the end region and differential leakages depend to some extent on p. If this influence is neglected, $T_{max}$ can be written as follows:

$$T_{max} \approx \pm \frac{3p}{4\omega} \frac{|\tilde{E}_{rated}|^2}{X'_r},$$

In other words, $T_{max}$ is approximately proportional to the number of poles p.

The rated torque $T_{rated}$ is obtained from the following relationship:

$$P_{rated} = T_{rated} \cdot \omega_m = C \cdot D_i^2 \cdot L_i \cdot n_m,$$

where C is the utilization factor of the machine, $D_i$ the rotor diameter, and $L_i$ the ideal rotor length. C is nearly independent of the pole number p. The value $n_m$ can be approximated as follows:

$$n_m \approx n_{ms} = 120 \cdot f/p,$$

Substituting this approximation for $n_m$ into the relationship for $P_{rated}$ gives the following relationship:

$$P_{rated} \approx T_{rated} \cdot \left(\frac{2\pi f}{p/2}\right) = C \cdot D_i^2 \cdot L_i \cdot \left(\frac{120 \cdot f}{p}\right).$$

As seen, $T_{rated}$ is independent of p, provided the influence of the phase belt design is neglected. However, this does not apply to the maximum torque $T_{max}$. If the influence of the phase belt design is not neglected, then the rated torque $T_{rated}$ will be different for the $p_1$ pole (low-speed) configuration and that of the $p_2$ pole (high-speed) configuration, as will be discussed below. Neglecting the influence of the phase belt design, $T_{rated}$ can be defined as follows:

$$T_{rated} = T_{rated}{}^{p1} = T_{rated}{}^{p2}$$

and $$n_{base} = n_{ms}{}^{p1} \approx n_{m\_rated}{}^{p1}.$$

Traditional machines can maintain rated torque until voltage reaches its rated value $V_{rated}$. Above that point the voltage remains constant while the frequency increases thus decreasing the flux density associated with the phase belts. This type of machine is described as having $V_{rated}/f$ control. In the instant disclosure, flux weakening is compensated for by modifying the number of poles, called $(V \cdot p)/f$ control, or decreasing the number of turns, $V/(f \cdot N)$ control. In either $(V \cdot p)/f$ control or $V/(f \cdot N)$ control $V \leq V_{rated}$.

Motor Operation

Figure 5:
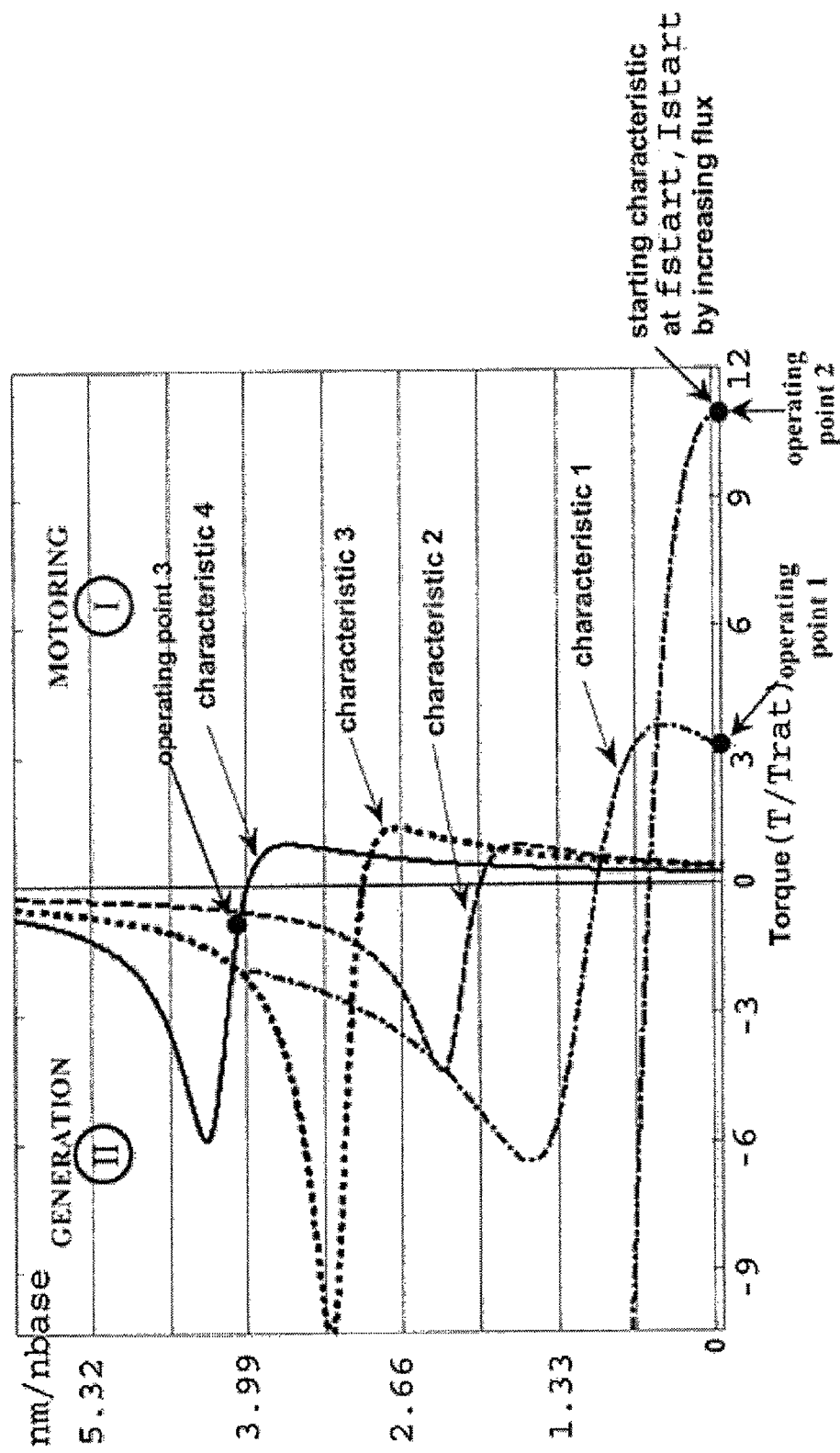
FIG. 5 shows speed-torque characteristics for the starting characteristic and characteristics 1-4 corresponding to four operating regions described in the disclosure.

FIG. 5 shows speed-torque characteristics for the starting characteristic and characteristics 1-4 corresponding to four operating regions described in the disclosure. The first operating region describes operation including and between the starting characteristic and characteristic 1 (see FIG. 6). The second operating region describes operation including and between characteristic 1 and characteristic 2 (see FIG. 7). The third operating region describes operation including and between characteristic 2 and characteristic 3 (see FIG. 8). The fourth operating region describes operation including and between characteristic 3 and characteristic 4 (see FIG. 9).

Figure 6:
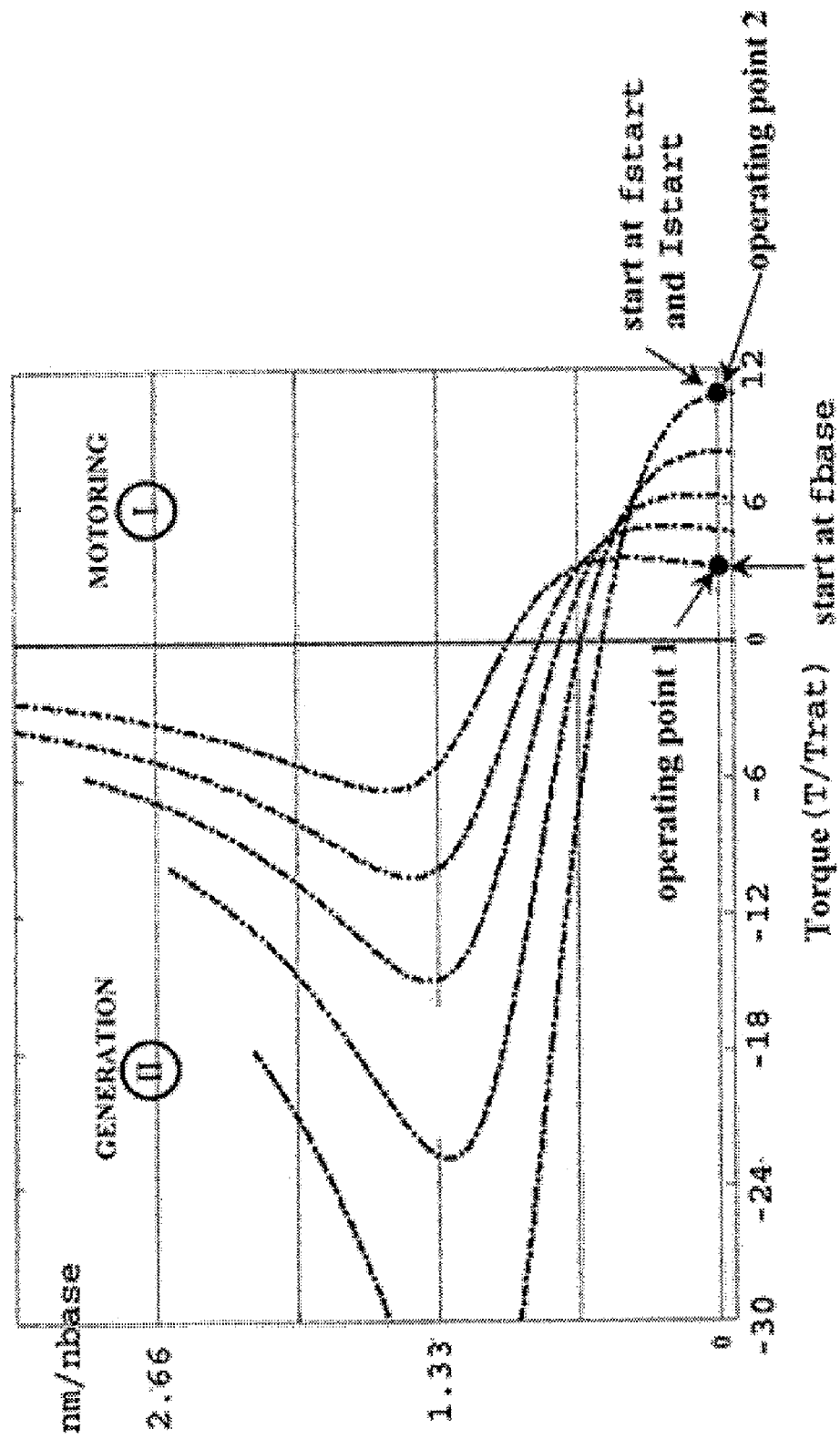
FIG. 6 shows 3 speed-torque characteristics between the starting characteristic and characteristic 1 of FIG. 5.

FIG. 6 shows 3 speed-torque characteristics between the starting characteristic and characteristic 1 of FIG. 5.

Figure 7:
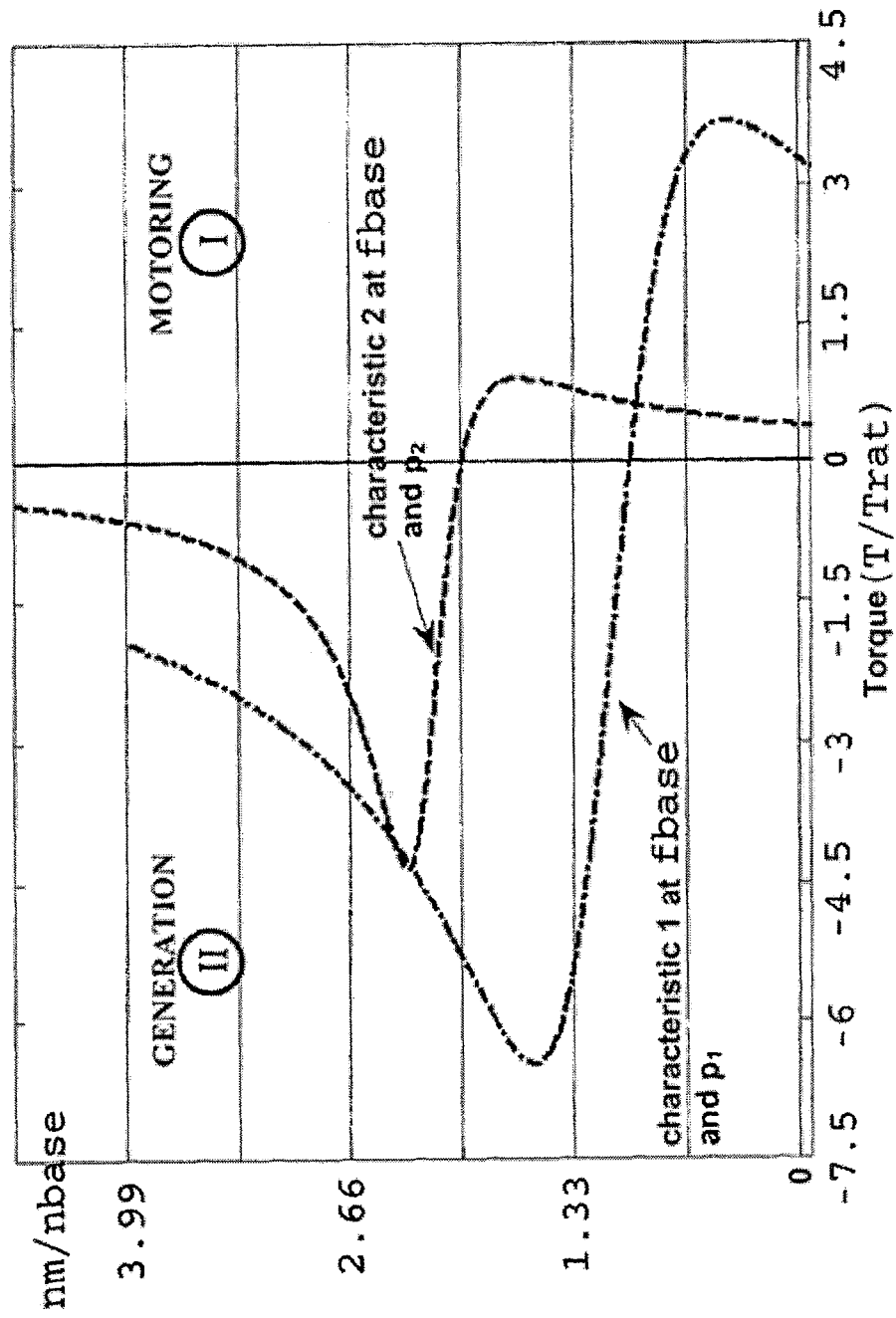
FIG. 7 shows speed-torque characteristic 1 and 2 of FIG. 5.

FIG. 7 shows speed-torque characteristic 1 and 2 of FIG. 5. The pole number change does not generate sufficient torque to start the machine from a speed of zero. Instead a rated voltage $V_{line-line-rated}$ is applied and the frequency f is increased from a starting frequency $f_{start}$ to a base frequency $f_{base}$. Preferably the starting frequency $f_{start}$ is not too low in order to avoid excessive current and saturation of the magnetic components. When the frequency f is between $f_{start}$ and $f_{base}$, this operating region is referred to as the starting region. In the starting region the speed spans 0 rpm to the base speed $n_{base}$.

Figure 8:
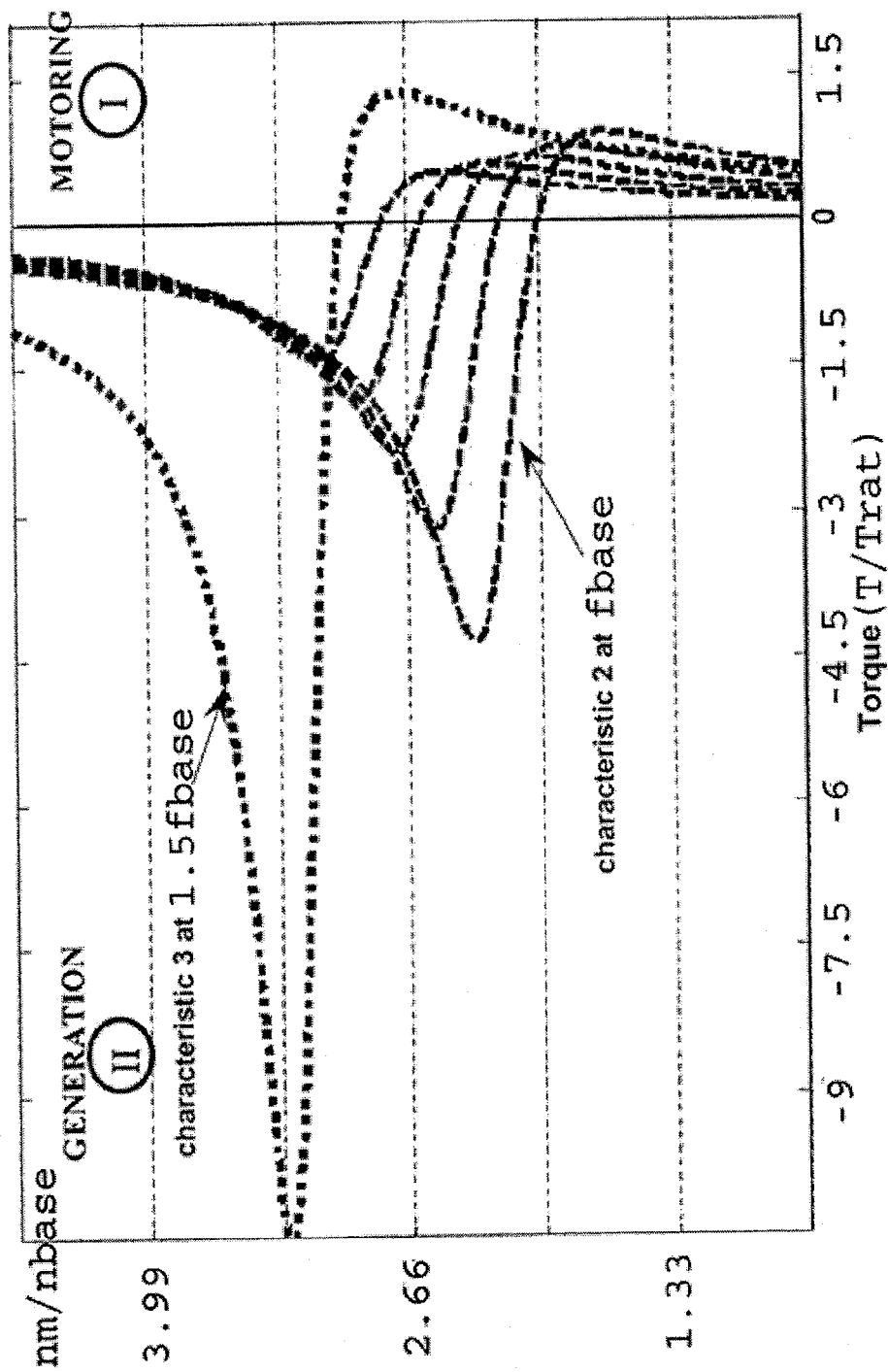
FIG. 8 shows 4 speed-torque characteristics between characteristic 2 and 3 of FIG. 5.
Figure 9:
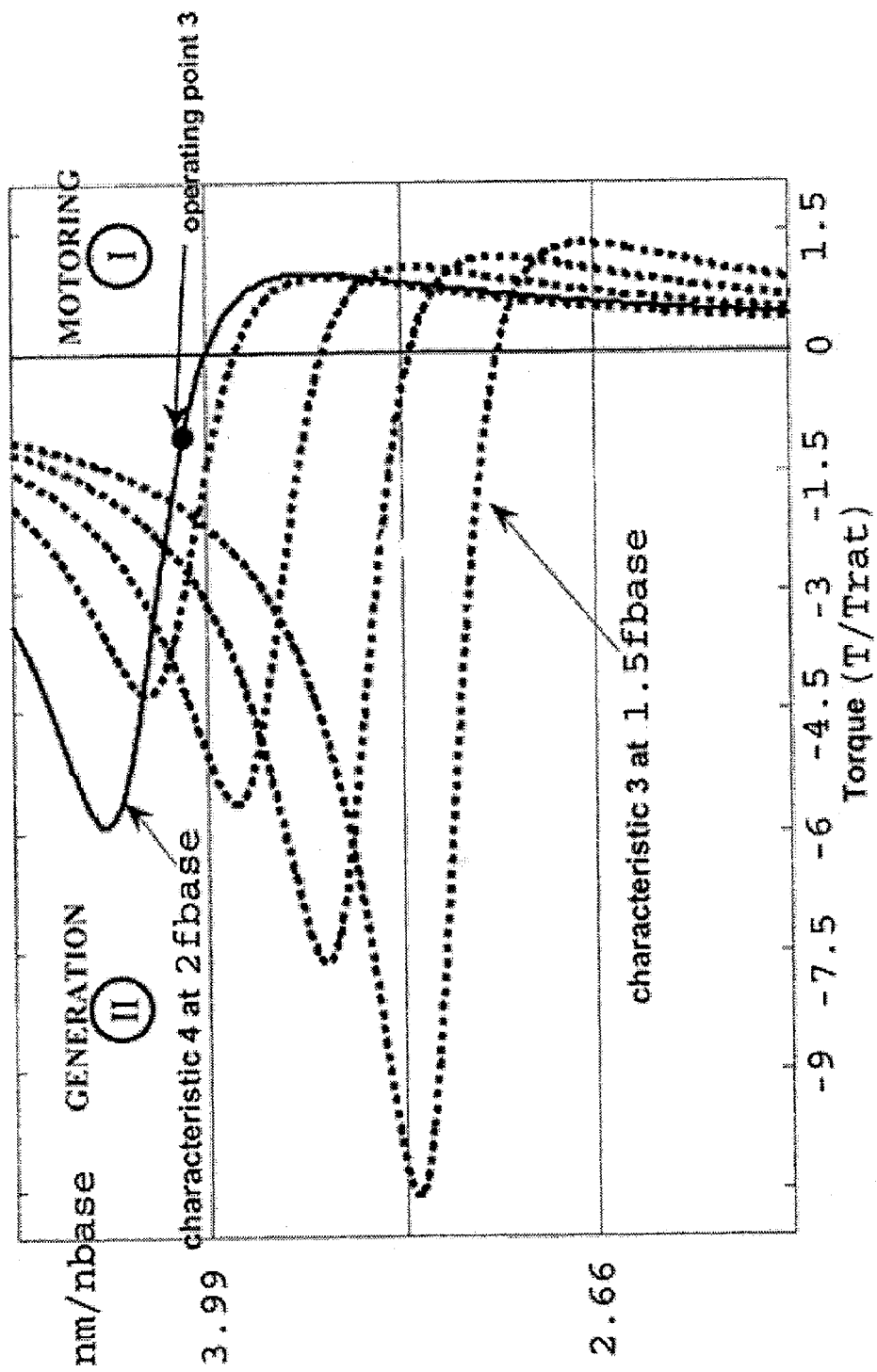
FIG. 9 shows 3 speed-torque characteristics between characteristic 3 and 4 of FIG. 5.

FIG. 8 shows 4 speed-torque characteristics between characteristic 2 and 3 of FIG. 5. The transitional speed-torque curves from the natural characteristic 2 to the natural characteristic 3 are depicted in FIG. 8, and flux weakening (V/f) control will be employed, whereby the flux densities are reduced to below the rated value. FIG. 9 shows 3 speed-torque characteristics between characteristic 3 and 4 of FIG. 5. From natural characteristic 3, at an increased (about rated) flux density due to $N = N_1 = N_0/2$, to natural characteristic 4 flux weakening (V/f) control with $N = N_1$ is performed. It is advisable to minimize the speed range between characteristic 2 and characteristic 3, as depicted in FIG. 8. Note that, in FIG. 8, the origin of the speed $n_m/n_{base}$ is not shown. The frequency $1.5 \cdot f_{base}$ has been chosen to clearly illustrate the effect of the reduction of the number of turns, but an optimization of the dynamics of the drive requires that $1.5 \cdot f_{base}$ should be less, say $1.3 \cdot f_{base}$.

FIG. 9 shows 3 speed-torque characteristics between characteristic 3 and 4 of FIG. 5. At the natural characteristic 3 the number of series turns $N_0 = N_{rated}$ will be reduced to $N_1 = N_0/2$ by a relay (having normally closed, NC, and normally open, NO, contacts) or electronic switches, thus effectively restoring the flux density to its rated (or larger) value and increasing, therefore, the torque and the output power of the motor—due to the reduction of the series number of turns from $N_0 = N_{rated}$ to $N_1 = N_0/2$. This increase in torque is about proportional to the ratio $(N_0/N_1)$.

The current drawn at zero speed is $I_{start} > I_{rated}$. As start-up occurs the starting current will decrease due to the frequency and the associated speed increase, and the motor reaches at the base frequency the base speed.

An example of the above-described machine could comprise an electric machine consisting of a pole-changing squirrel-cage induction machine with an accompanied reduction of the number of stator turns per phase. In order to provide a starting torque of $T_{start}/T_{rated} = 11$ (see FIG. 5) the machine will start as a $p_1 = 8$-pole machine operating at $f_{low} = f_{start}$ and a line-to-line voltage of about $V_{line-to-line-rated}$ supplied by the inverter, resulting in an increase of the flux density from say 0.55T to about 1.0T. Assume that $T_{rated} = T_{rated\_4poles}$ corresponds to the rated torque of the $p_2 = 4$ pole machine, where $T_{max\_4poles} \approx 3 \cdot T_{rated\_4poles}$, then the increase of the pole number by a factor of two results in $T_{max\_8poles} \approx 2 \cdot T_{max\_4poles}$, and the increase of the flux density during starting increases $T_{max\_8poles}$ by a factor of about $(1.0/0.55) = 1.82$: that is, $T_{start} = 3 \cdot 2 \cdot 1.82 = 11 \cdot T_{rated\_4poles}$ (see FIG. 5). In order to increase the operating speed the frequency is increased from $f_{low} = f_{start}$ to $f_{base}$. The speed should then increase to approximately $n_{rated} \approx n_{base}$. At this point the machine must change from, for example, $p_1 = 8$-pole to $p_2 = 4$-pole operation. This change is initiated by the controller. This change from $p_1$ to $p_2$-pole operation causes the machine to speed up to about $(p_1/p_2)n_{base}$. In order to increase the speed from this point on the operating frequency is increased from $f_{base}$ to about $(1.1$-$1.5)f_{base}$. This causes the speed of the machine to increase to above $(p_1/p_2)n_{base}$. In order to achieve further torque and speed increase (e.g., by a factor of 2), the number of series turns is reduced from $N_0 = N_{rated}$ to $N_1 = N_0/2$. Thereafter, the operating frequency is increased to a multiple of $f_{base}$ which results in the maximum desirable speed at a relatively large torque (e.g., twice rated torque, $T_{rated}$) compared to the torque generated when $N_0 = N_{rated}$.

Figure 10:
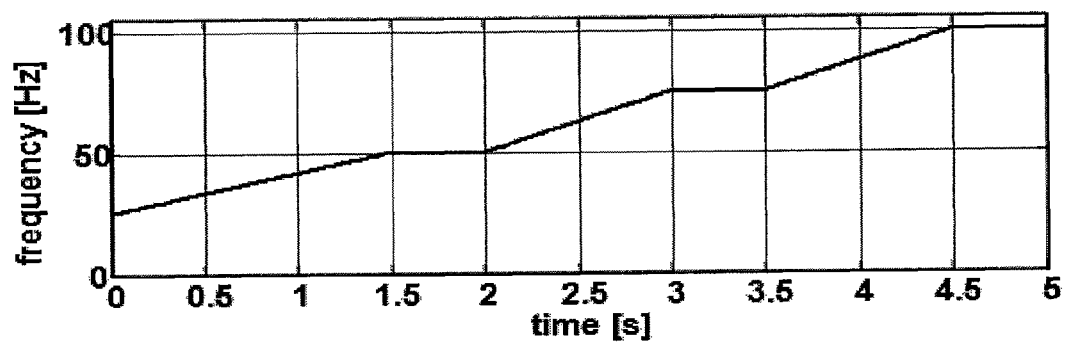
FIG. 10 is an example of a frequency-time diagram showing six operating regions of the present disclosure.
Figure 11:
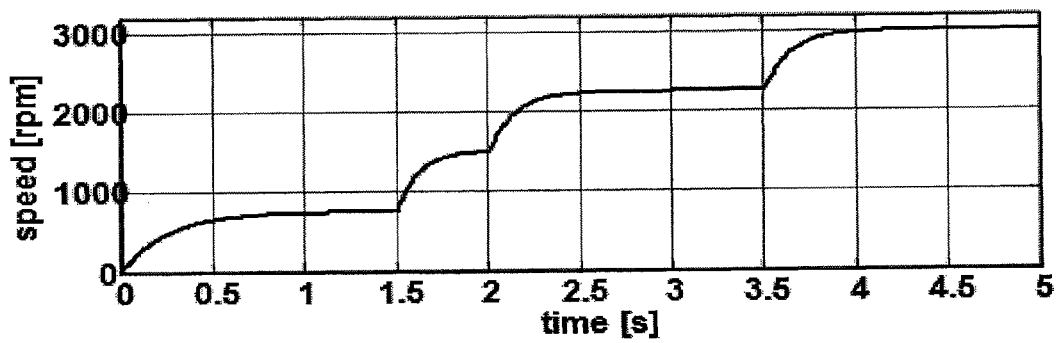
FIG. 11 is an example of a speed-time diagram showing six operating regions of the present disclosure.

FIGS. 10 and 11 show the time diagram for frequency changes and the resultant change in speed, respectively. The 8 to 4-pole change occurs at 1.5 seconds and the N-reduction occurs between 3 and 3.5 seconds.

An example of the startup operation of the electric machine from 0 to 6,000 rpm follows. Take the base speed of the drive to be $n_{base} = 750$ rpm. The frequency can be $f_{base} = f_{rated} = 50$ Hz. The pole configuration $p_1 = 8$ poles. The rated torque $T_{rated\_4poles}$ is that of a 4-pole machine ($p_2$ configuration) at the rated maximum flux density $B_{max} = 0.55T$ and at the rated speed, $n_{rated\_4poles} = 1,480$ rpm. Thus, $n_{rated\_4poles}$ is approximately $2 \cdot n_{base}$. This example assumes a three-phase induction machine with an output power of $P_{rated\_4poles} = 500$ W. This results in a rated torque of $T_{rated\_4poles}$ approximately equal to 2.7 Nm. The line-to-line voltages of the three-phase machine are maintained constant throughout the startup at $V_{line-to-line} = \sqrt{3} \cdot V_{phase} = \sqrt{3} \cdot V_{DC}/(2\sqrt{2})$. For a battery voltage—as used in the analysis and experimental verification—$V_{DC} = 200$ V one obtains the motor line-to-line voltage $V_{line-to-line} = 122.5$ $V_{rms}$. With these values the startup can be described as follows:

1) At t=0 s the speed is 0 rpm (see FIGS. 10, 11). Stator current frequency and voltage is $f_{10\_s} = f_{startup} = 25$ Hz. Stator current $I_{max\_start}{}^{8\text{-}poles}$ is 15 A (see FIG. 29). Starting torque $T_{startup}{}^{8\text{-}poles}=11\cdot T_{rated\_4poles}$ (see FIG. 5, operating point 2). The reduction of frequency from $f_{rated}=50$ Hz to $fl_{0\ s}=f_{startup}=25$ Hz results in an increase of the flux density (flux strengthening) by a factor of 2 $B_{max}|_{0\ s}=2\cdot B_{max}=1.1$ T, if saturation is neglected. The torque is about proportional to the stator current and this starting torque is reflected in FIG. 29: at $p_2=4$ pole and $N_{0=Nrated}$ steady-state operation $I_{max\_steady\_state}{}^{4\text{-}poles}=1.4$ A and at $p_1=8$ pole operation during start-up $I_{max\_startup}{}^{8\text{-}poles}=15$ A. From this it follows that $I_{max\_startup}{}^{8\text{-}poles}/I_{max\_steady\_state}{}^{4\text{-}poles}=15/1.4\approx11$ and is not the same as that of the conventional armature (E/f) control (an electric machine without pole switching).

2) Startup from t=0-1.5 s (see FIGS. 10, 11) occurs in the $p_1=8$ pole configuration. The motor increases its speed due to the increase of the frequency from $f_{startup}=25$ Hz to $f_{rated}=50$ Hz and the flux density decreases from $B_{max\_startup}=B_{max}|_{0\ s}=1.1$ T to about $B_{max}=B_{max\_rated}|_{1.5\ s}=0.55$ T due to the change of the pole number from $p_1=8$ to $p_2=4$ poles. This is reflected in characteristic 1 of FIG. 5. The speed is $n_{base}=750$ rpm (see FIG. 11) at $f_{rated}=50$ Hz, neglecting the slip.

3) Pole switching occurs at t=1.5 s and the pole number is decreased from $p_1=8$ to a $p_2=4$ at $f_{rated}=50$ Hz. The speed of the motor doubles and is now $n_{rated\_4poles}\approx(2\cdot n_{base})\approx1,480$ rpm$\approx$1,500 rpm at $f_{rated}=50$ Hz (FIG. 5, characteristic 2). At about 1,480 rpm the rated torque $T_{rated\_4poles}\approx2.7$ Nm is produced at $B_{max}=0.55$ T. The output power corresponds to its rated value $P_{rated\_4poles}=500$ W and is the same as that of the conventional armature (E/f) control.

4) The frequency increase during the period t=2-3.5 s from $fl_{2\ s}=f_{rated}=50$ Hz to $fl_{3.5\ s}=75$ Hz corresponding to a speed of $nl_{3.5\ s}\approx(75/50)\cdot1,500$ rpm$\approx$2,250 rpm results in field weakening operation decreasing the flux density from $B_{max\_rated}|_{2\ s}=B_{max}=0.55$ T to $B_{max}|_{3.5\ s}=(50/75)\cdot0.55$ T=0.37 T and reduces the torque from its rated value $T|_{2\ s}=T_{rated\_4poles}$ to $T|_{3.5\ s}=(50/75)\cdot T_{rated\_4poles}=0.67\cdot T_{rated\_4poles}$. The output power at t=3.5 s corresponds to the rated output power $P_{rated\_4poles}$ and is the same as that of the conventional flux-weakening (V/f) control.

5) At t=3.5 s the number of series stator turns is reduced from $N_0=N_{rated}$ to $N_1=N_0/2$, this increases the flux density at $fl_{3.5\ s}=75$ Hz to $B_{max}|_{3.5\ s\_(N_0/2)}=0.73$ T, which means at t=3.5 s—after the number of turns have been reduced by a factor of 2—the flux density is larger than the rated flux density $B_{max}|_{3.5\ s\_(N_0/2)}=73$ T, and the torque increases to $T|_{3.5\ s}=1.33\cdot T_{rated}{}^{4\text{-}poles}$ at $fl_{3.5\ s}=75$ Hz (see FIG. 5, characteristic 3). From FIG. 29 one gathers that the current increases by a factor of about 5.0 A/1.4 A=3.57 which supports the increase of the torque depending upon saturation by a factor of 2 to 4. The output power at $fl_{3.5\ s}=75$ Hz—after the switching of the series turns has been completed—is at steady state (increasing the flux density by a factor of 2), $P_{out}{}^{4\text{-}poles\_(N_0/2)}|_{3.5\ s}=2\cdot P_{rated\_4poles}$, which is twice that of the conventional flux-weakening (V/f) control. One can speak in this case of a compensation of flux weakening due to the reduction of the number of turns from $N_0$ to $(N_0/2)$.

6) From t=3.5-4.5 s the frequency is increased from $fl_{3.5\ s}=75$ Hz to $fl_{4.5\ s}=100$ Hz resulting in a speed of $(2\cdot n_{rated\_4poles})=(4\cdot n_{base})=3,000$ rpm. At t=4.5 s the torque is $$T|_{4.5s} = \left(\frac{75}{100}\right)\cdot 1.33 \cdot T_{rated\_4poles} \approx T_{rated\_4poles},$$

and the output power at t=4.5 s is $P_{out}{}^{4\text{-}poles\_(N_0/2)}|_{4.5\ s}=2\cdot P_{rated\_4poles}$, which is twice that of the conventional flux-weakening (V/f) control. The flux density at t=4.5 s is $B_{max}|_{4.5\ s\_(N_0/2)}=0.55$ T, which corresponds to the rated flux density and is twice that of the conventional flux-weakening (V/f) control. This again shows that flux weakening is compensated for and the maximum flux density is restored.

7) Above t=5 s the frequency is further increased from $fl_{4.5\ s}=100$ Hz to $fl_{5\ s}=133$ Hz and flux weakening sets in (see FIG. 5, characteristic 4). The speed is $nl_{5\ s}\approx(133/100)\cdot 2\cdot n_{rated\_4poles}=(5.32\cdot n_{base})=4,000$ rpm at $$T|_{5s} = \left(\frac{100}{133}\right)T_{rated\_4poles} \approx 0.75\, T_{rated\_4poles}$$

and $B_{max}|_{5\ s\_(N_0/2)}=(100/133)0.55$ T=0.41 T, which is twice that of the conventional flux-weakening (V/f) control. As shown, the machine can be used as a generator charging the battery of the power supply (FIG. 5, operating point 4) and depicted in FIG. 30 where $V_{DC\_rectifier}=200$V. Note, the horizontal axis of the oscillogram is indicated by the arrow 2.

8) A further increase of the frequency at t=6 s from $fl_{5\ s}=133$ Hz to say $fl_{6\ s}=200$ Hz (not shown in FIGS. 10 and 11) increases the speed to $nl_{6\ s}\approx(200/100)\cdot 2\cdot n_{rated\_4poles}=6,000$ rpm based on flux weakening. At the speed of $nl_{6\ s}=6,000$ rpm the maximum flux density will be $B_{max\_6000\ rpm}=0.27$ T and the torque will be $T_{6000\ rpm}{}^{4\text{-}poles}=0.5\cdot T_{rated\_4poles}$. The output power at $8\cdot n_{base}=4\cdot n_{rated}{}^{4\text{-}poles}=6,000$ rpm will be $P_{out\_6,000\ rpm}{}^{4\text{-}poles\_(N_0/2)}=(4\cdot 0.5\cdot 0.27/0.55)\cdot P_{rated\_4poles}\approx P_{rated\_4poles}$. The speed range for (V·p/N·f) control, where the rated output power is $P_{rated\_4poles}$, is twice the speed range that a conventional flux-weakening (V/f) control (see FIGS. 2, 3) can achieve.

The starting operation of the motor is transient, that is, the motor has to absorb a relatively large current, of multiples of the rated current (resulting in large losses), during a few seconds. This is acceptable provided the cooling of the motor is sufficient (e.g., water cooling). Efficiency considerations are deemed to be unimportant during starting; however, maximum temperature rises are a concern and a thermal analysis must be performed. Harmonics are a concern as well, because the starting procedure involves switching the number of poles from $p_1$ to $p_2$ and pulse-width-modulated (PWM) inverter operation, and both can result in harmonic torques.

Generator Operation

The alternator or regenerative braking operation occurs in quadrant II of any of the characteristics 1 to 4 (see FIGS. 5-9). Once the machine has gained about the base speed the only stringent requirement is an efficiency of between about 75-95%. At regenerative operation of the alternator the PWM inverter acts as a PWM rectifier providing excitation for the generator if necessary, and delivering generator power to the battery or the power source at a DC voltage of VDC.

Overall Machine Design

The machine can include phase belts, a controller, and a converter (inverter/rectifier). The poly-phase machine design is based on machine geometric data and iron-core characteristics for the stator and rotor. As an example, a machine with 24 stator slots has been chosen. Other suitable stator slot numbers (e.g., 36, 48, 54, 72 etc.) are possible. A 3-phase stator winding has been chosen because 3-phase windings are very frequently used for drive applications. Other phase numbers are possible as well, such as 2, 5, and higher number of phases. For this example, the pole numbers $p_1=8$ and $p_2=4$ have been chosen. Other pole number combinations are also feasible. All analytical and experimental results are based on a reduction of the number of series turns from $N_0=N_{rated}$ to $N_1=N_{rated}/2$. Other reductions of the series turns, for instance $N_1=N_{rated}/3$, are also possible.

Phase Belt Connections

The machine includes a plurality of phase belts, each wrapped around one or more teeth of the stator. The phase belt inductance can be altered in one of two ways: by changing the connections between coils in a phase belt from series to parallel, or vice versa; or by changing the connections between phase belts in a given phase from series to parallel, or vice versa. Changing the connections between coils in a phase belt from series to parallel is equivalent to changing the number of turns in a phase belt from a first number of turns $N_0$ to a second and lower number of turns $N_1$.

As described earlier, preferably two or more phase belts can form poles. The number of poles, like the number of turns (phase belt inductance), can also be electronically switched. The configuration for a first number of poles can be defined as $p_1$, and the configuration for a second number of poles can be defined as $p_2$. In an embodiment, the number of poles can be changed by switching the connections between phase belts from series to parallel connections, or vise versa. There are multiple ways to make such a change, but a particularly efficient way to do so (using the fewest switches) is to change the pole configurations from delta ($\Delta$), to double wye (Y).

The reduction of the number of series turns from $N_0=N_{rated}$ to $N_1$ can be performed in several ways, three versions of which are described below. For Version 2, experimental data are included.

Figure 12:
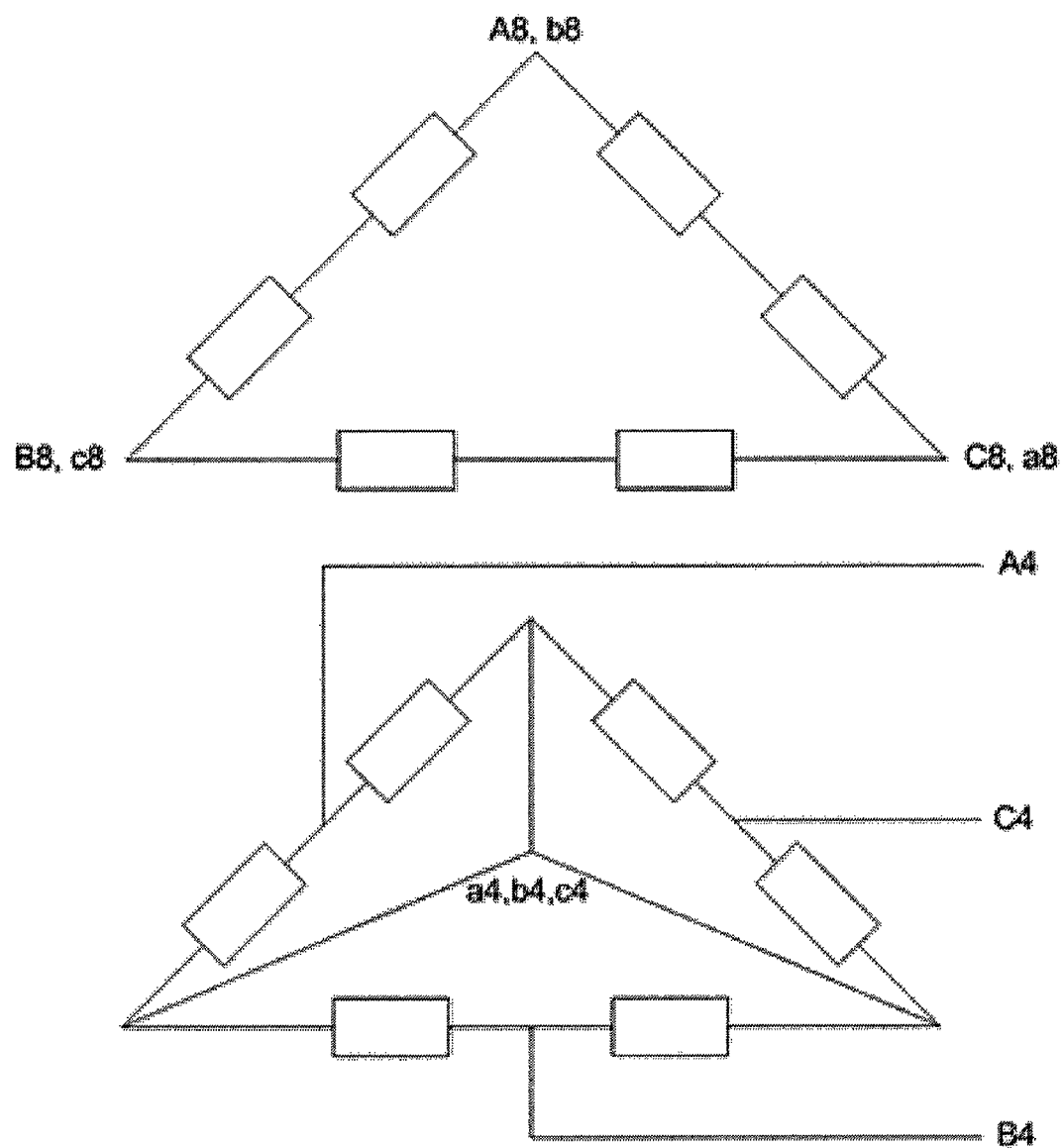
FIG. 12 illustrates two 3-phase stator winding diagrams for an embodiment of the $p_1$-pole configuration, delta ($\Delta$), and the $p_2$-pole configuration, double wye (Y).

FIG. 12 illustrates two 3-phase stator winding diagrams for an embodiment of the $p_1$-pole configuration, delta ($\Delta$), and the $p_2$-pole configuration, double wye (Y).

Figure 13:
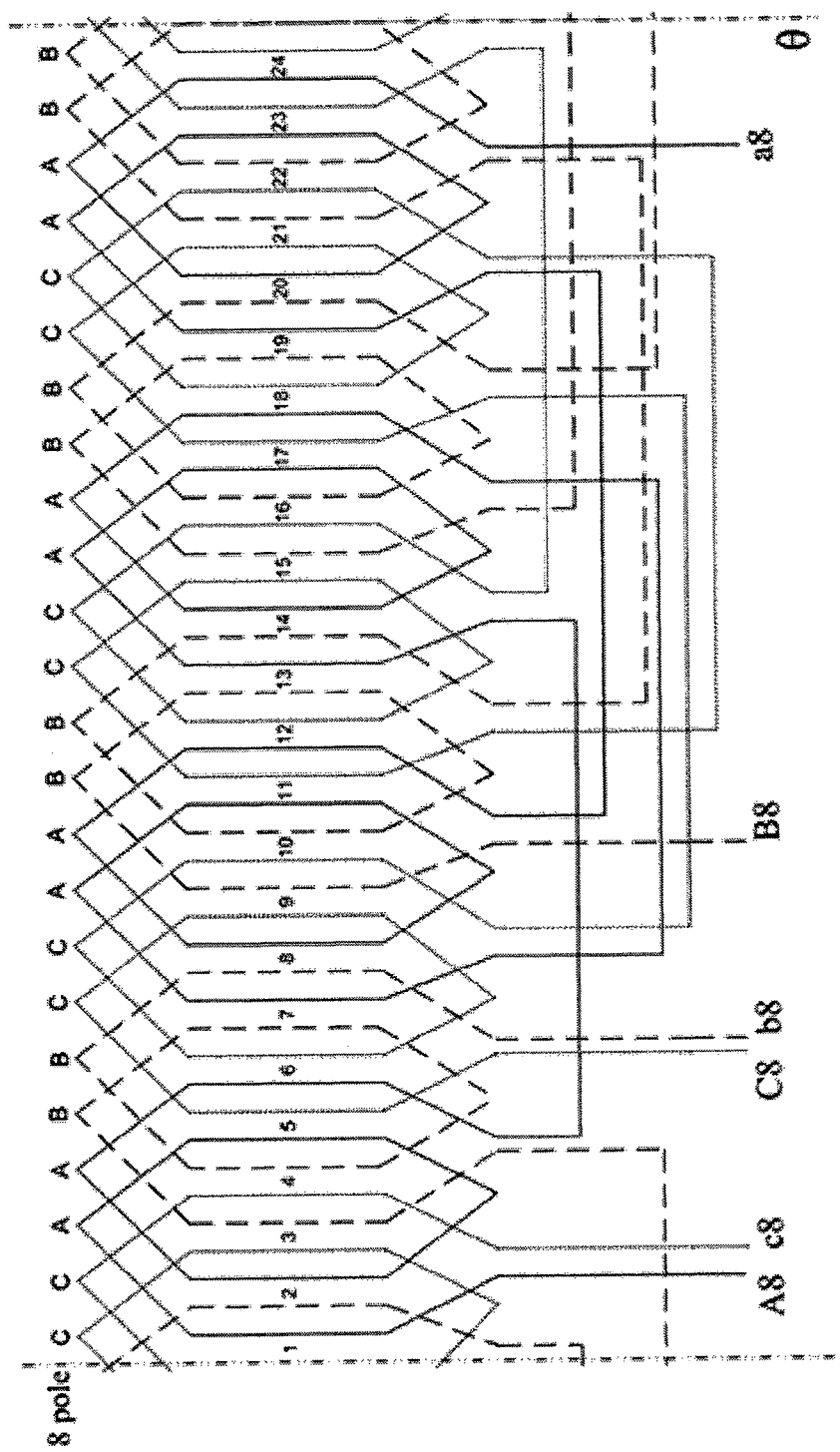
FIG. 13 illustrates an embodiment of a $p_1$ pole configuration ($N_{rated}$, 8-pole, $\Delta$).
Figure 14:
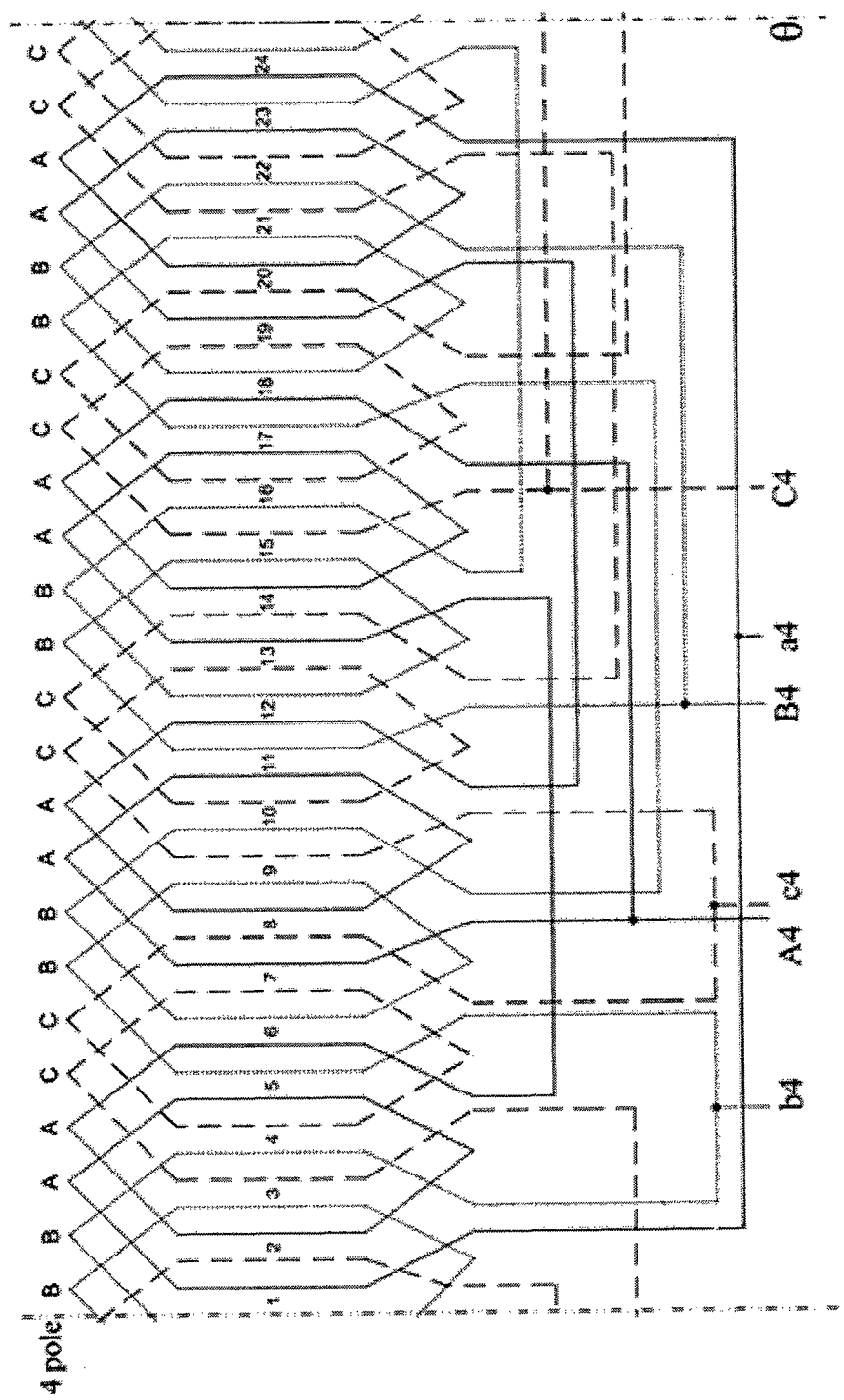
FIG. 14 illustrates an embodiment of a $p_2$ pole configuration ($N_{rated}$, 4-pole, double Y).

FIG. 13 illustrates an embodiment of a $p_1$ pole configuration ($N_{rated}$, 8-pole, $\Delta$). FIG. 14 illustrates an embodiment of a $p_2$ pole configuration ($N_{rated}$, 4-pole, double Y). FIGS. 13, and 14 depict the winding diagrams for $p_1=8$-pole at $N_0$, and $p_2=4$ pole at $N_0=N_{rated}$ configurations, respectively. The $p_1$-pole configuration is implemented using a $\Delta$ connection and the $p_2$-pole uses a double Y connection.

Figure 15:
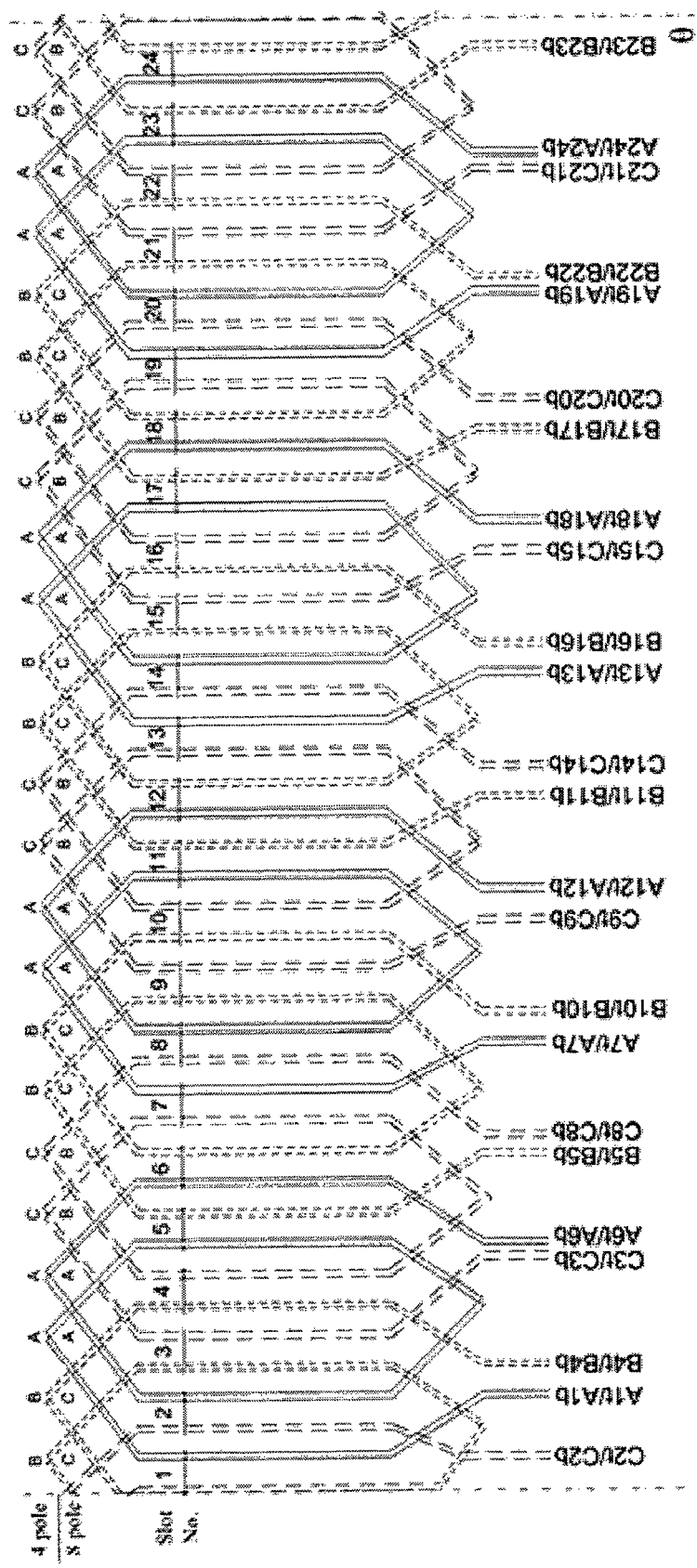
FIG. 15 illustrates terminal leads of phase belts for the embodiments illustrated in FIGS. 13 and 14.

FIG. 15 illustrates terminal leads of phase belts for the embodiments illustrated in FIGS. 13 and 14. These leads must then be connected to the switching board (control system) so that they can be switched by a controller. The controller may be connected to an application specific integrated circuit (ASIC) representing the switches as described below.

Figure 16:
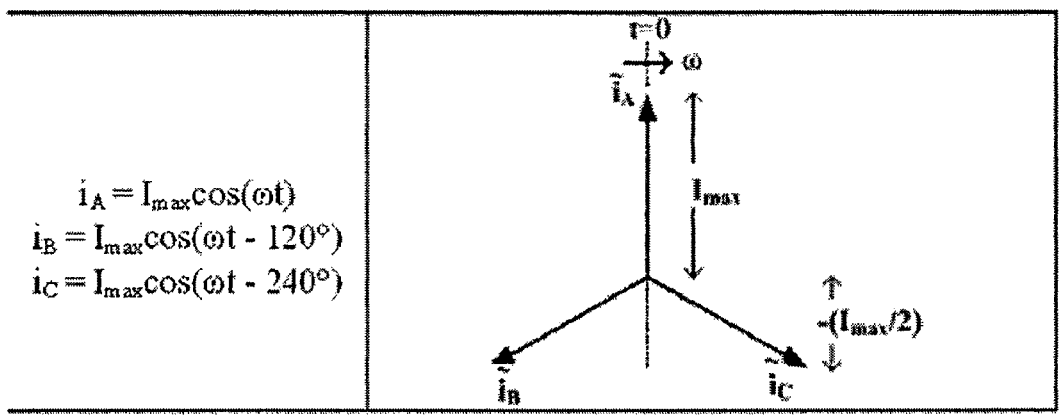
FIG. 16 illustrates a 3-phase current diagram with a rotating time axis.
Figure 17:
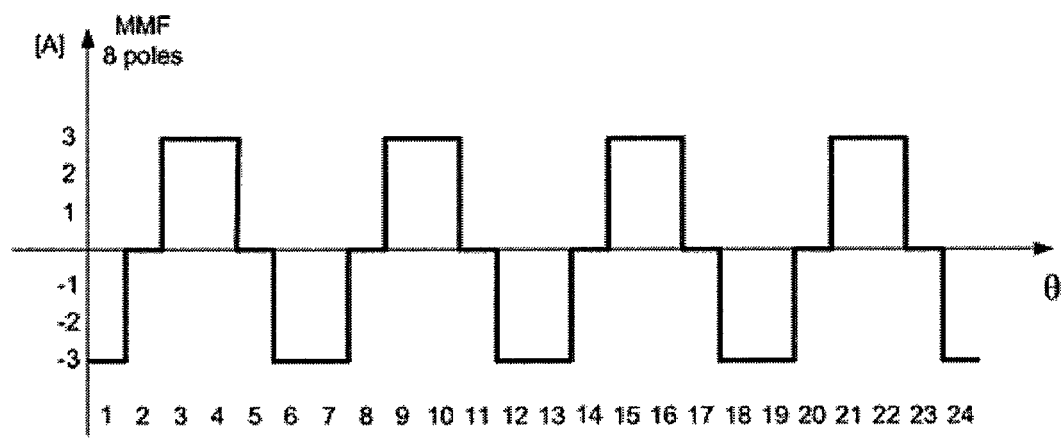
FIG. 17 illustrates a plot of magneto-motive force ("MMF") for the FIG. 13 winding configuration.
Figure 18:
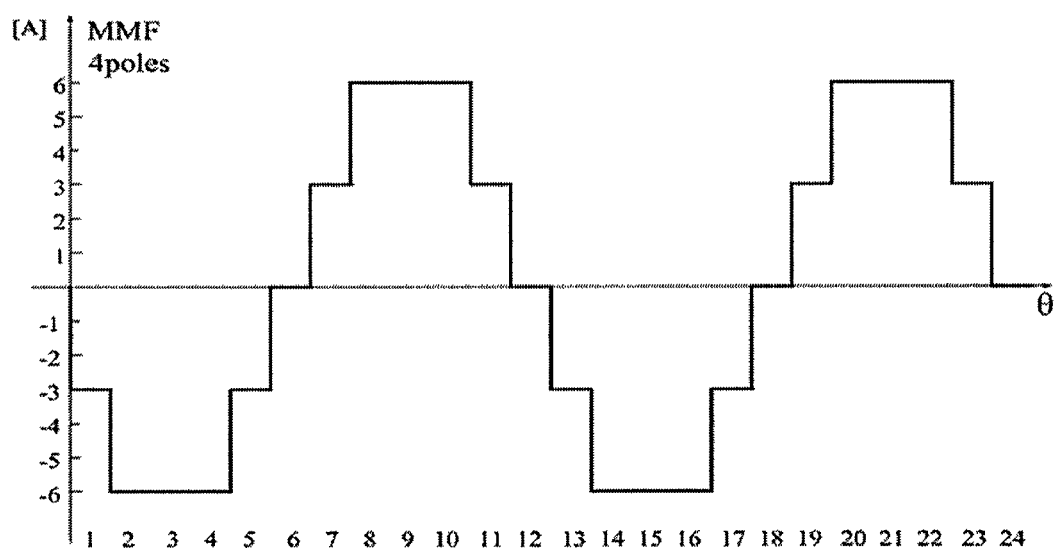
FIG. 18 illustrates a plot of MMF for the FIG. 14 winding configuration.

FIG. 16 illustrates a 3-phase current diagram with a rotating time axis. FIG. 17 illustrates a plot of magneto-motive force ("MMF") for the FIG. 13 winding configuration. FIG. 18 illustrates a plot of MMF for the FIG. 14 winding configuration. In addition, a position encoder may be attached to the shaft of the machine—or the speed can be obtained based on computations—in order to implement closed-loop control; for open-loop control such an encoder is not required.

Figure 19:
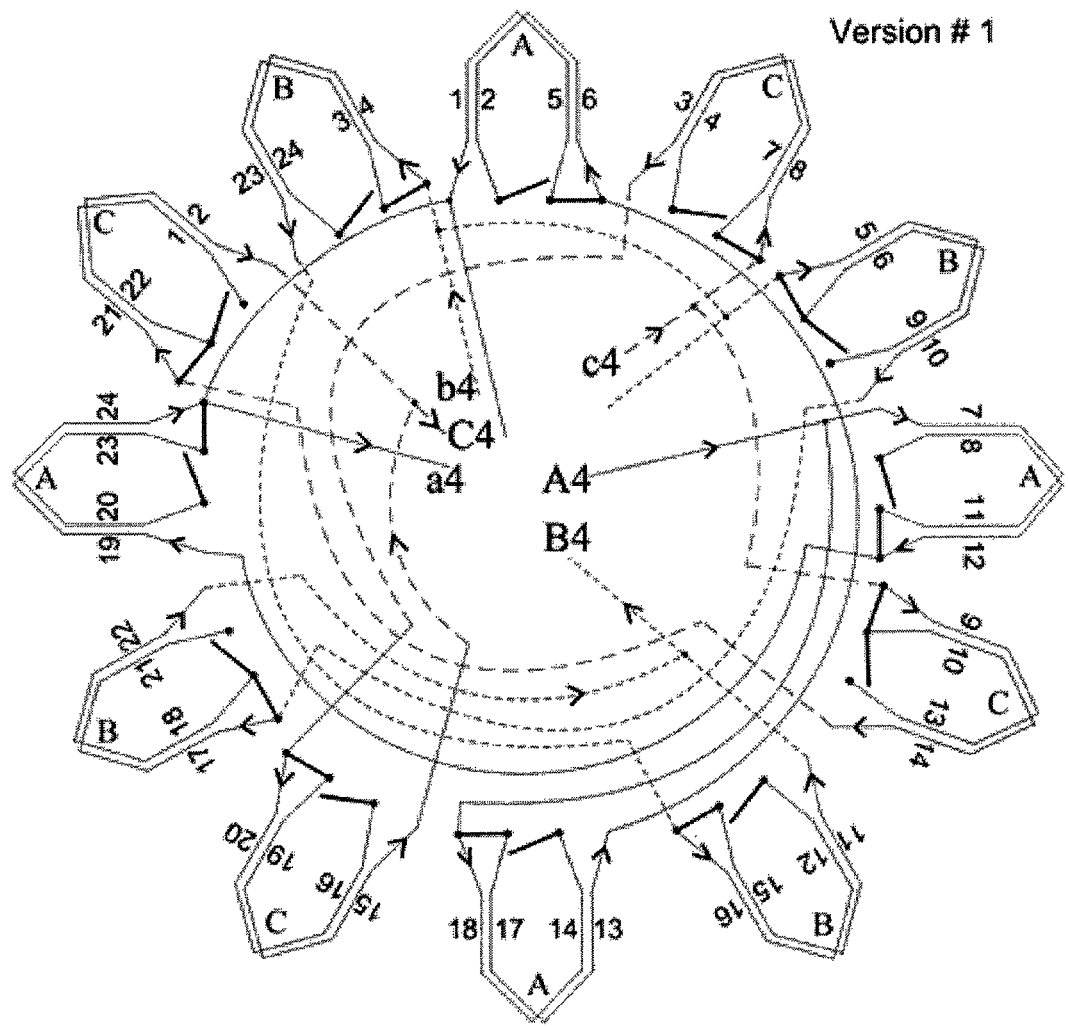
FIG. 19 illustrates a first view of a first embodiment of a winding configuration.

FIG. 19 illustrates a first view of a first embodiment of a winding configuration. The 3-phase stator winding includes the switches required to achieve a reduction of the number of series turns from $N_0=N_{rated}$ to $N_1=N_{rated}/2$ for Version 1.

FIG. 20 illustrates a second view of the winding configuration illustrated in FIG. 19. FIG. 20 illustrates the complete winding and switch diagram for Version 1 including the switches for changing the number of poles and the number of turns.

Figure 21:
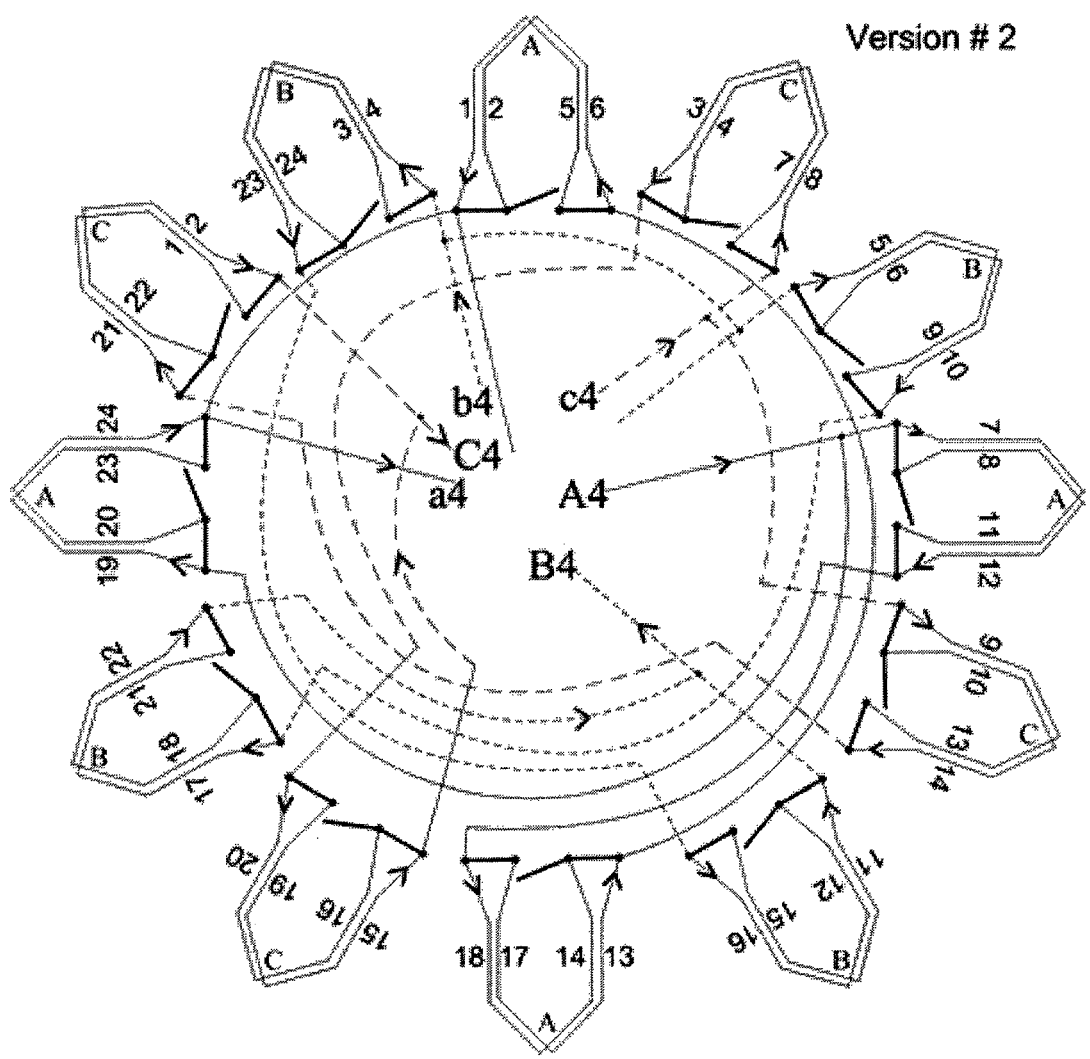
FIG. 21 illustrates a first view of a second embodiment of a winding configuration.

Correspondingly, FIG. 21 illustrates a first view of a second embodiment of a winding configuration. The diagram of the 3-phase stator winding includes the switches required to achieve a reduction of the number of series turns from $N_0=N_{rated}$ to $N_1=N_{rated}/2$ for Version 2.

Figure 22:
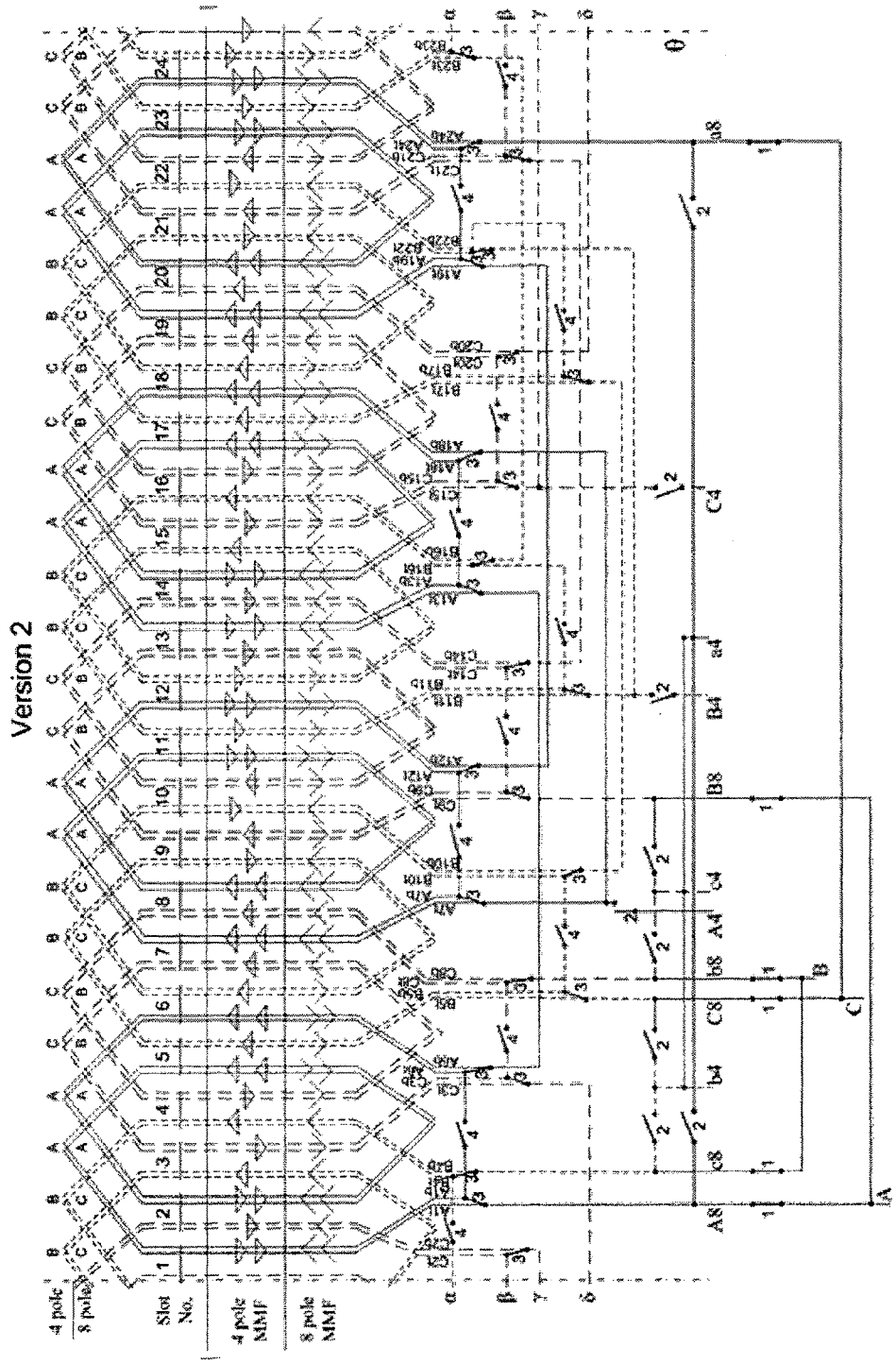
FIG. 22 illustrates a second view of the winding configuration illustrated in FIG. 21.

FIG. 22 illustrates a second view of the winding configuration illustrated in FIG. 21.

Figure 23:
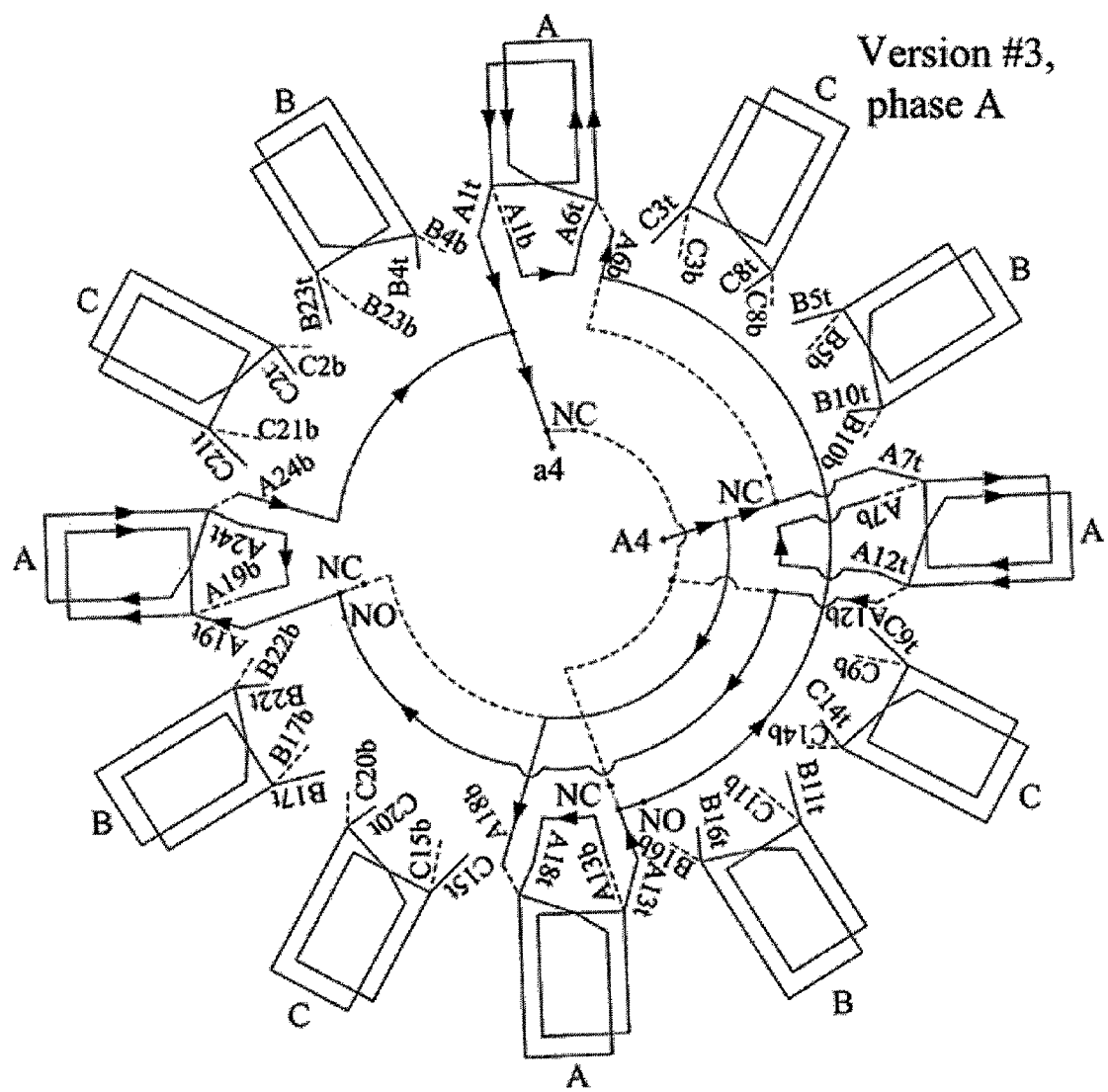
FIG. 23 illustrates phase A of a third embodiment of a winding configuration.
Figure 24:
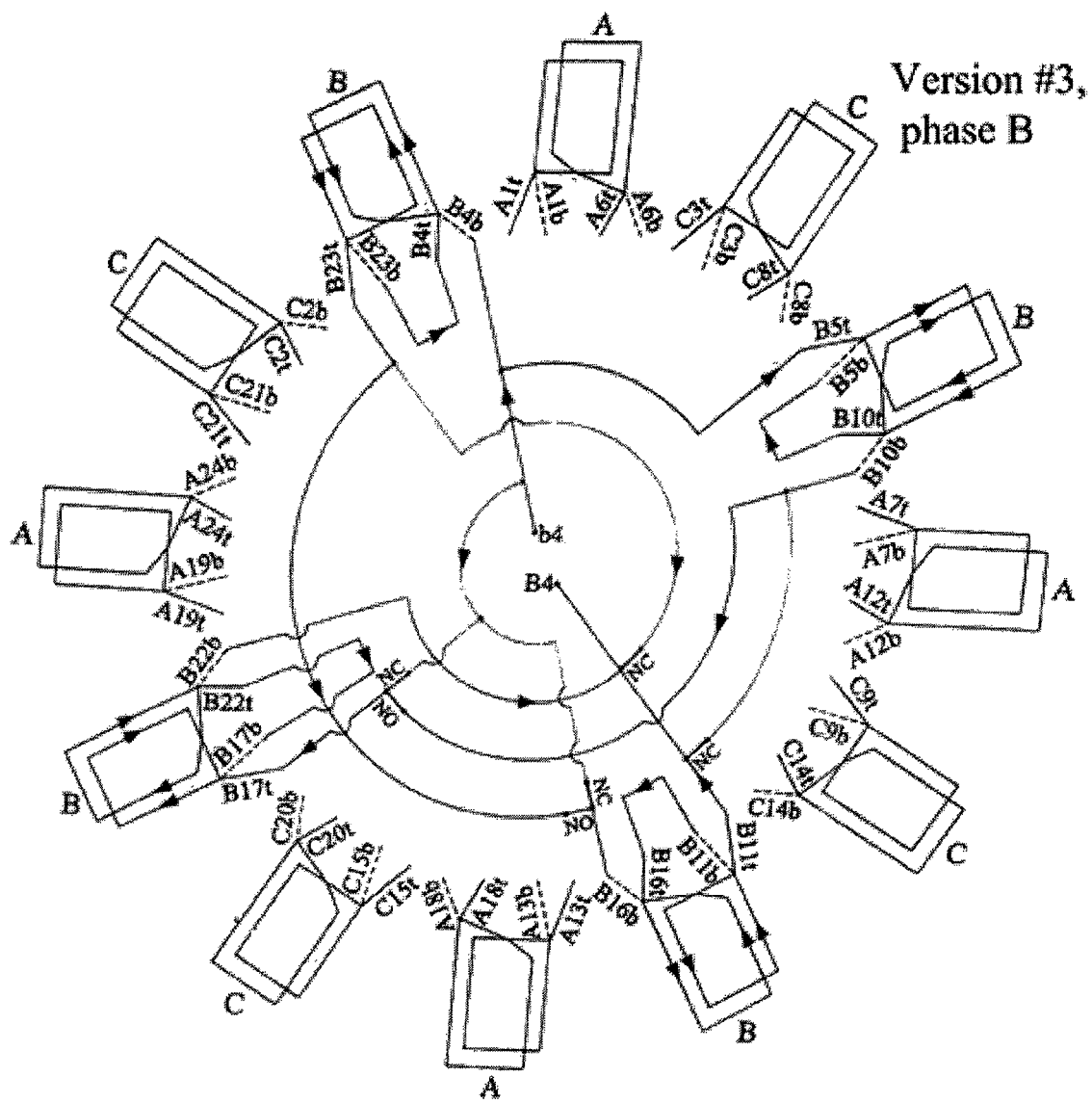
FIG. 24 illustrates phase B of the third embodiment of a winding configuration.
Figure 25:
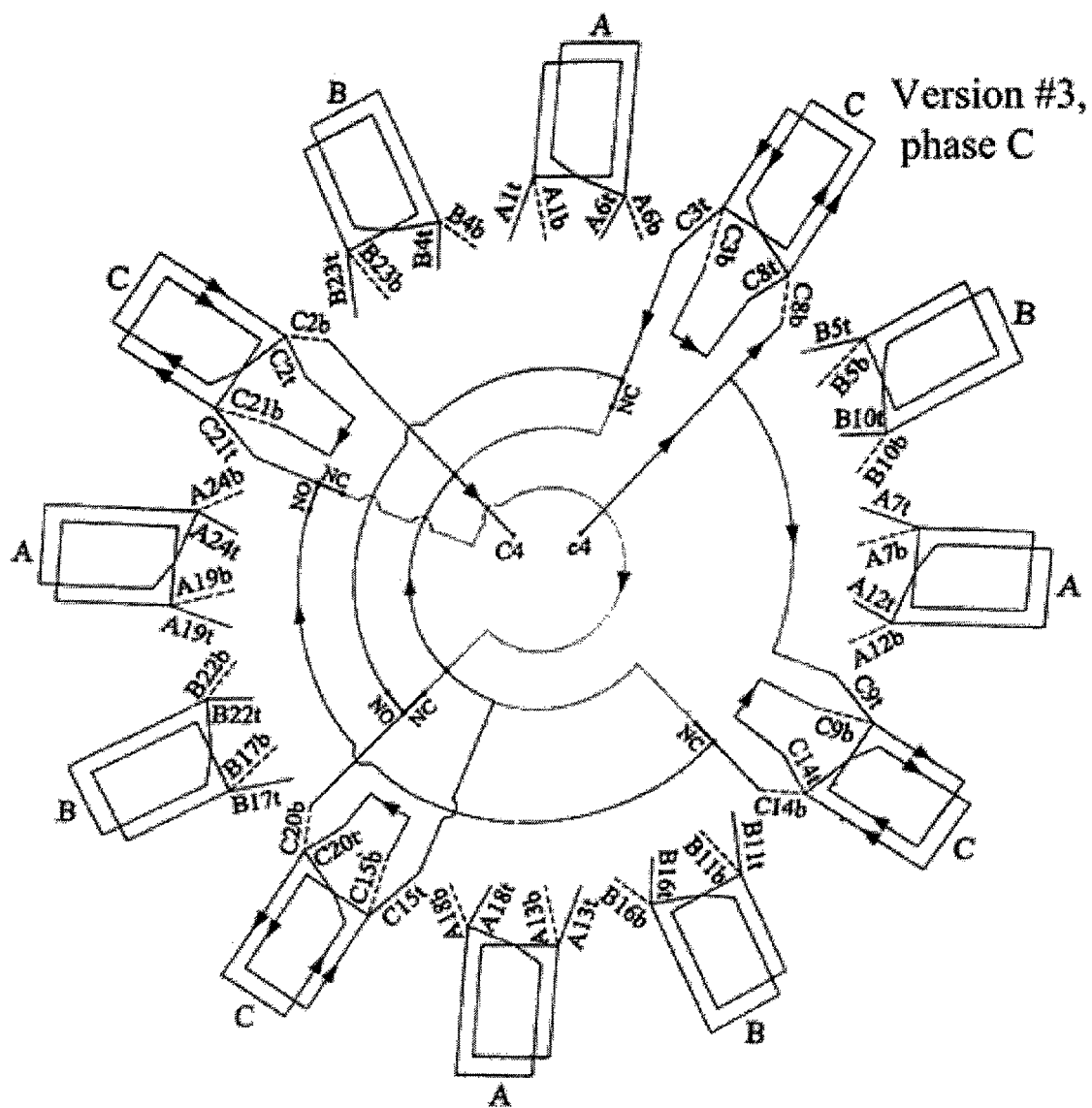
FIG. 25 illustrates phase C of the third embodiment of a winding configuration.

FIGS. 23, 24, and 25 depict the stator winding diagrams of the three phases including the switches required to achieve a reduction of the number of series turns from $N_0=N_{rated}$ to $N_1=N_{rated}/2$ for Version 3. FIG. 23 illustrates phase A of a third embodiment of a winding configuration. FIG. 24 illustrates phase B of the third embodiment of a winding configuration. FIG. 25 illustrates phase C of the third embodiment of a winding configuration.

In order to implement the switches, relay or electronic switches can be employed. For Version 2 a total of 10 relays are used: 7 of them have 3 NO (normally open) and 3 NC (normally closed) contacts and the remaining 3 relays have 2 NO and 4 NC contacts. Note, that not all contacts are used: for Version 2, Table 1 lists the number and types of contacts for the implementation of the winding changes, that is, switchover from $p_1$ to $p_2$ poles and the reduction of the number of series turns per phase from $N_0=N_{rated}$ to $N_1=N_{rated}/2$. Switch group refers to the number shown next to each switch in FIG. 22 representing Version 2. Table 1 indicates that for Version 2 21 NO and 30 NC contacts are required. Similar considerations apply to Versions 1 and 3. Version 2 is the most general and flexible approach, but it requires the most switches. Version 3 requires the least amount of switches: in this latter case the series connection of (two) phase belts of each phase is reconfigured from series connection to parallel connection.

TABLE 1

Winding switches required for Version 2, FIG. 22

| Switch Group | $p_1$ = 8 poles, $N_0$ | $p_2$ = 4 poles, $N_0$ | $p_2$ = 4-poles, $N_1 = N_0/2$ |
| --- | --- | --- | --- |
| 1 (6 NC, normally closed) | on | off | off |
| 2 (9 NO, normally open) | off | on | on |
| 3 (24 NC, normally closed) | off | off | on |
| 4 (12 NO, normally open) | on | on | off |

Converter (Inverter/Rectifier) Design

The converter may fulfill at least the following two functions: (1) inverter operation during starting acceleration (motoring), and (2) rectifier operation during regenerative braking as the poly-phase machine functions as an alternator feeding DC power to the battery or power source.

In addition, the converter may provide for both (motoring, generation) operating regimes reactive power to the poly-phase machine in order to supply its magnetizing current so that the appropriate flux can be established within the machine. Alternatively, the induction generator can be excited by a capacitor bank.

The required specifications of the converter operated as an inverter are as follows:

Input DC voltage: $V_{DC}$

Frequency range: $f_{low} \leq f_{base} \leq f_{high}$

Current at low frequency $f_{low}$: multiple times the rated current per phase (maximum current).

Output voltage: as high as possible for given input voltage $V_{DC}$

Power factor: lagging power factor $\cos(\phi)$ from 0 to 1.0.

Maximum current limitation to limit current spikes during switching of number of turns N.

The required specification of the converter operated as a rectifier is as follows:

Output voltage: $V_{DC}$ at multiple times $I_{alternator-rated}$.

Controller Design

The controller in accordance with this disclosure preferably may be designed so that a successful start-up from zero speed to multiple times the base speed can occur during a few seconds. The controller may be configured to do the following at a constant output voltage, $V_{line-line-rated}$, of the inverter: (1) change the frequency of the inverter from $f_{low}$ to $f_{base}$ when operating at speeds below (at $p_1$ and $N_{rated}$) and including characteristic 1 at $N_{rated}$; (2) provide the switching signals for switching the stator phase belts from a $p_1$-pole configuration to a $p_2$-pole configuration at $f=f_{base}$ and rated $V_{line-line-rated}$ (or reduced) output voltage of the inverter. As a result the motor operates on natural characteristic 2 at $f=f_{base}$ at $N_{rated}$; (3) initiate the switching signal so that the number of series turns per phase belts can be reduced and change the frequency at constant output voltage of the inverter $V_{line-line-rated}$ from $f_{base}$ to $f>f_{base}$ resulting in ($V_{rated}/[f\cdot(N_1/N_{rated})]$) control so that natural characteristic 3 can be reached at $f>f_{base}$; (4) change the frequency at constant output voltage of the inverter $V_{line-line-rated}$ from $f>f_{base}$ to f being a multiple of $f_{base}$, resulting in ($V_{rated}/f\cdot N_1$) control so that natural characteristic 4 can be reached at f being a multiple of $f_{base}$; (5) provide gating signals so that the PWM inverter can be used as a PWM rectifier feeding current into the battery or power source at $V_{DC}$ during regenerative braking, and at the same time provide the magnetizing current of the (e.g., induction) machine. Alternatively, the induction generator can be excited by a capacitor bank. To limit the charging current to the battery or power source, the output voltage of the alternator must be adjustable (e.g., either increased or decreased) so that the battery/power source lifetime will not be reduced by charging with a too-large current; (6) either provide switching signals for current snubbers so that the switching spikes of the currents can be limited and the inverter rating must therefore not be increased to accommodate the spikes or alternatively limit the maximum inverter output current so that no current spikes can occur during switching of the number of turns.

Experimental Verification

In most electric machines the torque is about proportional to the square of the rotor current I. As an experimental verification of the reduction of the number of series turns $N_{rated}$, the starting torque and the line current were measured. At low saturation there exists about a square relationship between starting torque and the starting current, that is, $T_{start} \approx \text{constant}_1 \cdot I_{start}^2$, however, at high saturation this relationship is about linear, that is $T_{start} \approx \text{constant}_2 \cdot I_{start}$.

Figure 26:
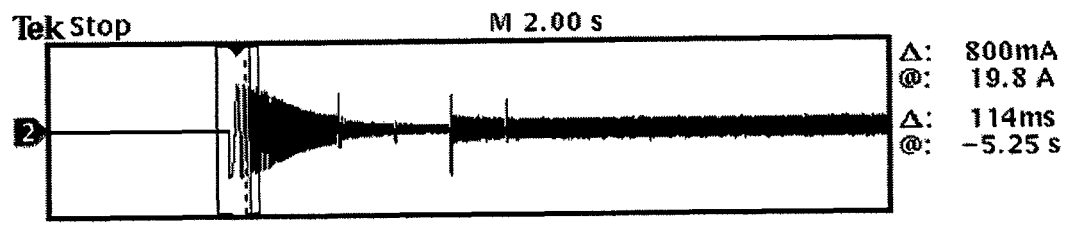
FIG. 26 is an oscilloscope readout showing current versus time, and created by the winding configuration illustrated in FIGS. 21 and 22.
Figure 27:
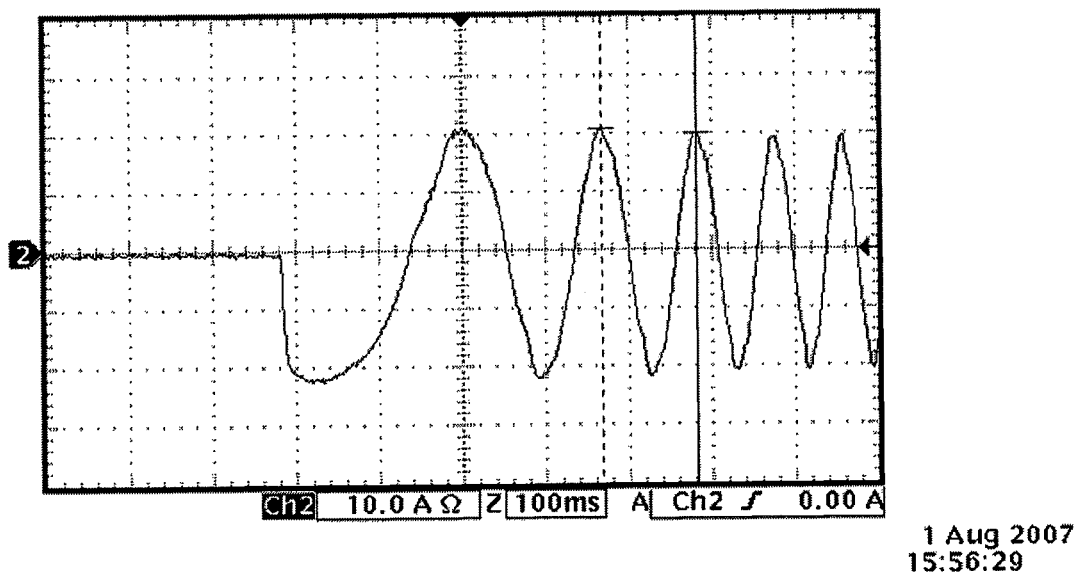
FIG. 27 is an expanded view of the startup region of the oscilloscope readout of FIG. 26.

FIG. 26 is an oscilloscope readout showing current versus time, and created by the winding configuration illustrated in FIGS. 21 and 22. The start-up currents from zero to maximum speed are depicted for different conditions in FIGS. 27 to 29. FIG. 27 is an expanded view of the startup region of the oscilloscope readout of FIG. 26. In this region there is no pole changing or number of turns changing. It merely shows the high torque that can be achieved by using a high number of poles during startup (at low speeds).

Figure 28:
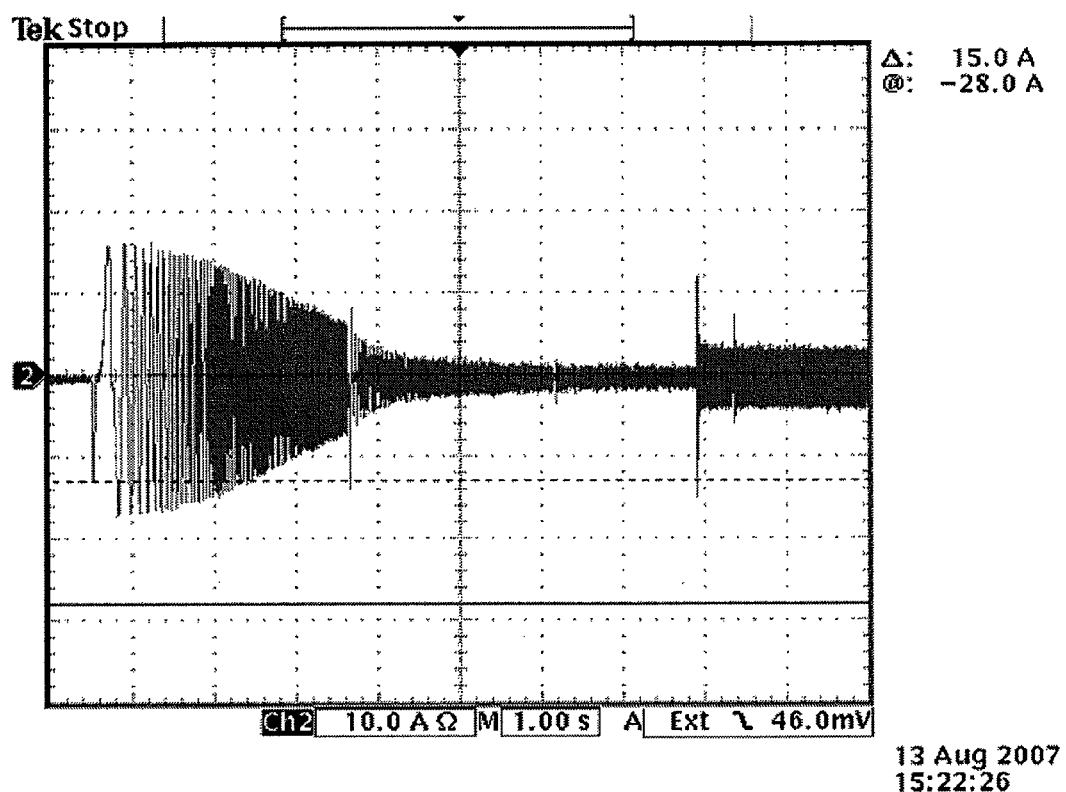
FIG. 28 is an oscilloscope readout showing the startup region, and the switch from $N_0$ to $N_1$ occurring many seconds after the switch from $p_1$ to $p_2$.

FIG. 28 is an oscilloscope readout showing the startup region, and the switch from $N_0$ to $N_1$ occurring many seconds after the switch from $p_1$ to $p_2$. At about 3.5 seconds a transient current spike shows the timing of the pole configuration change from $p_1$ to $p_2$. About 4.3 seconds after the pole change, the number of turns is decreased from $N_0$ to $N_1$. During this 4.3 second region, torque is decreasing since the machine suffers from flux weakening or (V/f) control in this region (after the pole switch but before the number of turns decrease). To avoid this flux weakening region, the time between pole switching and number of turns decrease can be minimized.

Figure 29:
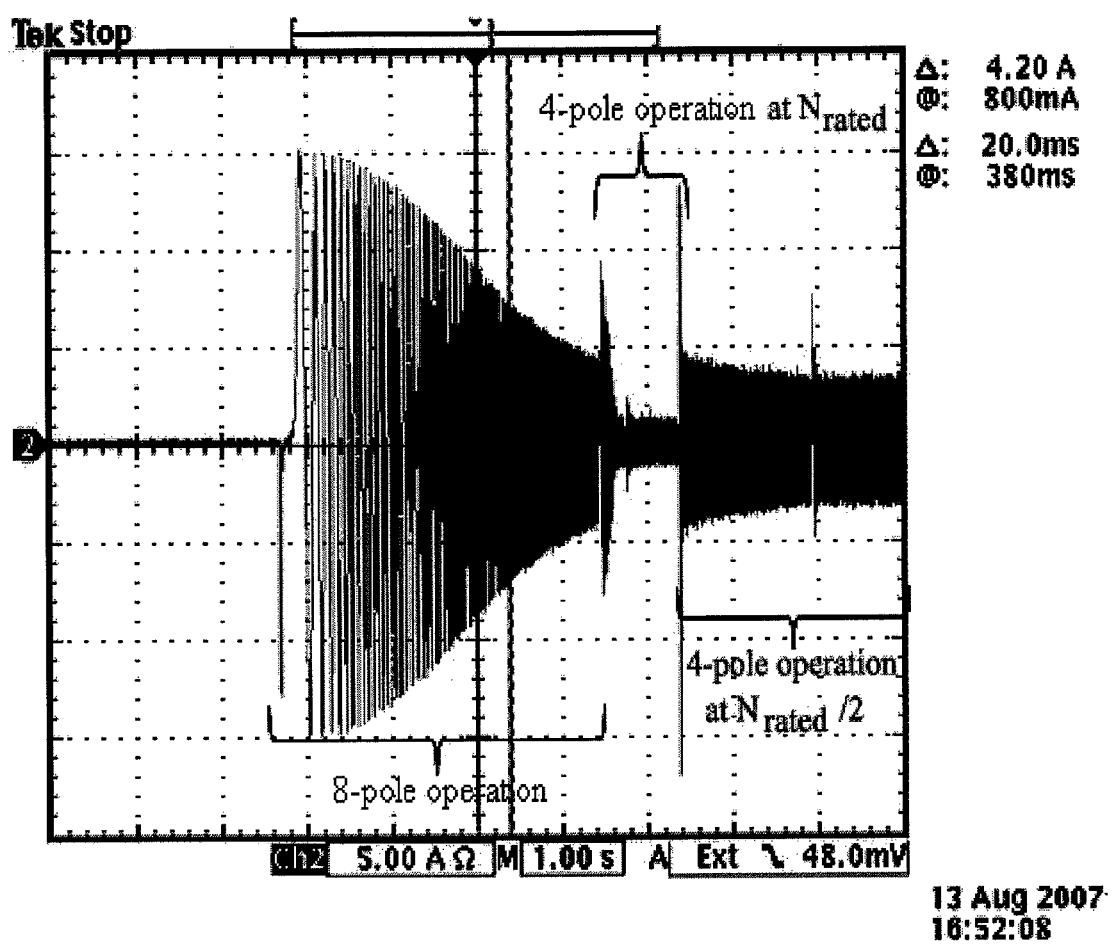
FIG. 29 is an oscilloscope readout showing the startup region, and the switch from $N_0$ to $N_1$ occurring around one second after the switch from $p_1$ to $p_2$.

FIG. 29 is an oscilloscope readout showing the startup region, and the switch from $N_0$ to $N_1$ occurring around one second after the switch from $p_1$ to $p_2$. In this example, the time between the pole switch and the number of turns decrease is much shorter than that illustrated in FIG. 28. As a result, the torque is returned to a higher value quicker—flux weakening comes into play for a shorter period of time. The reduction of the number of turns occurs 1.0 second after the switchover from $p_1$ to $p_2$; in this case the current spike due to the reduction of the number of turns is larger. Ideally the number of turns would be decreased right after the pole configuration change in order to avoid any flux weakening region. However, it was found that if the timing between the pole change and decrease in the number of turns was less than about one second, the machine would saturate, thus decreasing the machine's efficiency. There is also the potential for permanent damage. Thus, for now the minimum timing between pole change and the decrease in the number of windings is around one second, but this is not a limiting factor. In the future means will likely be found to allow a shorter (in terms of seconds) flux weakening region between the pole change and decrease in the number of turns, such that saturation is avoided.

From FIG. 29 one concludes that the starting current (or torque) corresponds to about 3 units while the maximum current (or torque) at maximum speed with $N_1 = N_{rated}/2$ corresponds to 1 unit. Comparing this to the operation with $p_2$ and $N_{rated}$—where the maximum current (or torque) at maximum speed is 0.25 units—one finds that the reduction of the number of turns by a factor of 2 increases the maximum current (or torque) by a factor of at least 3, assuming a proportionality between torque T and current I. To minimize the inverter power/current rating the current spikes can be either suppressed by current snubbers or the maximum inverter output current can be limited via inverter design. This suppression is not shown in the oscillograms of FIGS. 26-29.

Figure 30:
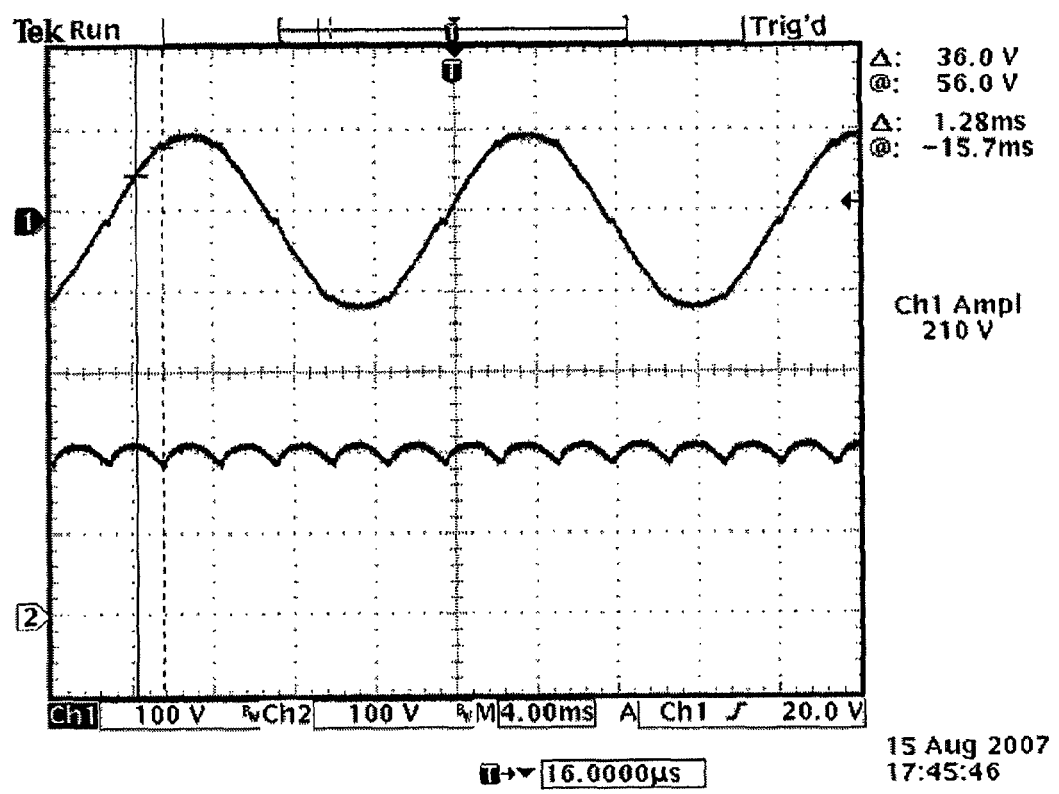
FIG. 30 is an oscilloscope readout showing voltage versus time for a generator (upper trace) and a rectifier (lower trace), and created by the winding configuration illustrated in FIGS. 21 and 22.

FIG. 30 is an oscilloscope readout showing voltage versus time for a generator (upper trace) and a rectifier (lower trace), and created by the winding configuration illustrated in FIGS. 21 and 22.

Advantages of the Disclosure

Throughout this specification, exemplary embodiments have been described and illustrated. The two key concepts to achieve this performance (increase in speed and torque) are: (1) switching (using relays or electronic switches) of the stator number of poles from $p_1$ to $p_2$, and (2) switching (using relays or electronic switches) of the number of series turns in each phase belt. These two concepts can be either separately or jointly implemented in a variable-speed drive in accordance with the present disclosure. In accordance with the present disclosure, many improvements in machine construction and operation may be realized.

These may include the possibility of designing a polyphase electric machine capable of delivering starting torque within the range $(5\text{-}11)\cdot T_{rated}$. The lower range $(5\cdot T_{rated})$ can be obtained, for example, with standard-type (e.g., squirrel-cage induction) machines and the upper range $(11\cdot T_{rated})$ is obtained with machine designs having reduced stator resistance and leakage inductances. In the case of an induction machine a double-squirrel cage rotor winding may improve the dynamic performance during switching of the number of turns.

$(V_{rated}/f)$ control, at steady-state and while above the base speed, generates no more than rated output power (or torque). In contrast, $(V_{rated}/f\cdot N)$ control, at steady-state and while above the base speed, generates greater-than-rated output power (e.g., twice the output power at two times the rated speed). This is accomplished via reducing the number of series turns N in each phase belt. $(V_{rated}/f)$ control variable-speed drives, at steady-state, can generate a power density per unit weight of 3 kW/(kg-force). In contrast, $(V_{rated}/f\cdot N)$ control, at steady-state, can generate a power density per unit weight of up to 5-6 kW/(kg-force).

While with $(V_{rated}/f)$ control the maximum obtainable speed is about 3 times the base speed, with $(V_{rated}\cdot p/f\cdot N)$ control about 4 times the rated speed, and about 6-8 times the base speed can be obtained. This speed increase may make mechanical gears obsolete and thus reduce vehicle weight, cost of production, and cost of maintenance.

Higher torque at lower speed is obtained through increasing flux-density above its rated value. This process is also known as flux strengthening. Increased torque at higher speed is obtained through compensation of flux weakening. Increased torque at high speed can improve the power output by a factor of two and lead to the power density of 5-6 kW/(kg-force).

The $(V_{rated}\cdot p/f\cdot N)$ control appears to be suitable for hybrid/electric propulsion applications because the reduction in the number of turns N for each phase belt is equivalent to an increase of the applied voltage $V_{rated}$ without actually increasing the voltage of the power supply (e.g., battery, DC capacitors). This is advantageous for vehicle applications where the battery voltage is limited to, say $300V_{DC}$ because of safety considerations. For example, although the electric machine is supplied with $300V_{DC}$ only, it behaves like a machine fed by $600V_{DC}$, resulting in larger (e.g., two times) output power per unit of weight measured in kW/(kg-force).

Despite vehicle battery voltages often being limited to 300 $V_{DC}$ (for safety), the $(V\cdot p/N\cdot f)$ control leads to a motor line-to-line voltage of $V_{line\text{-}to\text{-}line}$ equal to 184 $V_{rms}$. A speed range of 0 to 6,000 rpm can be achieved via the resulting output power/torque characteristics of the machine under $(V\cdot p/N\cdot f)$ control. In contrast, conventional (V/f) control can only achieve this speed range if a $V_{line\text{-}to\text{-}line}$ of 368 $V_{rms}$ is used. This voltage requires a DC-DC converter to convert the conventional 300 $V_{DC}$ battery voltage into a 600 $V_{DC}$ voltage (required to reach the $V_{line\text{-}to\text{-}line}$ of 368 $V_{rms}$). The converter increases total weight and increases the losses by at least about 4%. The mechanical gears required to produce the required starting torque further increase the drive train weight.

Inverter switches (conducting in reverse direction) or a separate diode bridge together with AC capacitors can be employed to operate the electric (induction) machine as a generator supplying regenerated energy to battery or DC capacitors. Thus the (e.g., induction) machine operating as a generator can either be excited via the PWM inverter from the battery or via AC capacitors.

For automobiles with internal combustion engine only, the starter and the generator can be integrated in one machine. The application of $(V/f\cdot N)$ control—where $V \leq V_{rated}$—to wind power plants permits a simplification of the blade-pitch control of the wind turbine because as the speed of the wind turbine increases the torque of the generator can be increased, and the turbine can be operated at any speed—except the maximum speed where feathering or shut down occurs—under stalled conditions.

To summarize, this disclosure allows $(V\cdot p/f\cdot N)$ control over an electric machine capable of the following: (1) producing programmable torque-speed characteristics with increased torques below and above rated speed (5-11 times the rated torque, and at least twice the rated torque, respectively) through flux reinforcement and compensation of flux weakening; (2) generating a range of 0 to 6-8 times base speed (at least twice that of state-of-the-art drives); (3) generating at least twice the output power (5-6 kW/kg-force) as state-of-the-art drives; (4) using half the battery voltage (300V), which is much safer than the 600V of (V/f) control for the speed range of (2); and (5) resulting in higher efficiency and less weight because there is no need for a DC-DC boost converter or mechanical gears.

While various embodiments of the present invention have been described in detail, it is apparent that modifications and adaptations of those embodiments will occur to those skilled in the art. For example, while the instant disclosure has been described in terms of the $p_1$ stator winding being connected in $\Delta$ and the $p_2$ pole stator winding in double Y, other configurations are also possible. Where $p_1$ is configured in $\Delta$ and the $p_2$ in double Y, $(P_{p1\text{-}design})/(P_{p2\text{-}design})$ is less than 1 and its torque ratio is larger than 1. However, for hybrid/electric drives where a large torque is preferred at low speed, the $p_1$ pole stator winding may be connected in double Y and the $p_2$ pole stator winding may be connected in $\Delta$. In that case the power ratio, $(P_{p1\text{-}design})/(P_{p2\text{-}design})$, is about 1 and its torque ratio is about 2. Alternatively, a configuration where torque or output power increases with angular velocity, $\omega_m$, suitable for wind power plants, the $p_1$ pole stator winding may be connected in Y and the $p_2$ pole stator winding may be connected in double Y. This results in a power ratio $(P_{p1\text{-}design})/(P_{p2\text{-}design})$, which is about one half, and which has a torque ratio about one. It should be expressly understood that such modifications and adaptations are within the spirit and scope of the present invention.

What is claimed is:

1. A multiphase inductance-changing and pole-changing electric machine operable at above rated parameters comprising:
   a stator having a plurality of phase belts, wherein each phase belt comprises two or more coils, and wherein each of the two or more coils in a phase belt are initially connected in series;
   a rotor driven by currents in the stator; and
   a control system connected to the plurality of phase belts and configured to:
   (a) apply an alternating current to the plurality of phase belts at a first time and at a frequency equal to a first frequency, wherein the first frequency is below a rated frequency;
   (b) increase the frequency to a second frequency during a time period spanning the first time and a second time;
   (c) decrease a number of poles at a third time;

(d) increase the frequency to a third frequency during a time period spanning a fourth time and a fifth time;
(e) decrease the inductance of the plurality of phase belts at a sixth time; and
(f) increase the frequency to a fourth frequency during a time period spanning a seventh time and an eighth time.

2. The machine of claim 1, wherein to decrease the number of poles, the series connections between phase belts are switched to parallel connections.

3. The machine of claim 1, wherein the time period spanning the fourth and fifth time periods is minimized without saturating the machine.

4. The machine of claim 1, wherein to decrease the inductance of the plurality of phase belts, the series connections between the two or more coils in the phase belts are switched to parallel connections.

5. The machine of claim 1, wherein to decrease the inductance of the plurality of phase belts, the series connections between the phase belts in a phase are switched to parallel connections.

6. The machine of claim 1, wherein the phase belts are initially connected in a delta configuration, and wherein to decrease the number of poles, the delta configuration is switched to a double wye configuration.

7. The machine of claim 1, wherein the phase belts are initially connected in a double wye configuration, and wherein to decrease the number of poles, the double wye configuration is switched to a delta configuration.

8. The machine of claim 1, wherein the phase belts are initially connected in a wye configuration, and wherein to decrease the number of poles, the wye configuration is switched to a double wye configuration.

9. The machine according to claim 1, wherein the second frequency equals the rated frequency.

10. The machine according to claim 1, wherein the second time equals the third time.

11. The machine according to claim 1, wherein the fifth time equals the sixth time.

12. A multiphase inductance-changing and pole-changing electric machine operable at above rated parameters comprising:

a stator having a plurality of phase belts, wherein each phase belt comprises two or more coils, and wherein each of the two or more coils in a phase belt are initially connected in series;
a rotor driven by currents in the stator; and
a control system connected to the plurality of phase belts and configured to:
(a) increase frequency of an alternating current applied to the plurality of phase belts during a first time period;
(b) decrease a number of poles in the stator at a second time;
(c) further increase the frequency of the alternating current applied to the plurality of phase belts during a second time period;
(d) decrease an inductance of the plurality of phase belts at a third time; and
(e) further increase the frequency of the alternating current applied to the plurality of phase belts during a third time period.

13. The machine of claim 12, wherein the second time period follows the second time.

14. The machine of claim 12, wherein the third time period follows the third time.

15. A method of operating an alternating current machine at above rated parameters, the method comprising:
(a) increasing frequency of an alternating current applied to a plurality of stator phase belts during a first time period;
(b) decreasing the number of poles in the stator at a second time;
(c) further increasing the frequency of the alternating current applied to the plurality of stator phase belts during a second time period;
(d) decreasing the inductance of the plurality of stator phase belts at a third time; and
(e) further increasing the frequency of the alternating current applied to the plurality of stator phase belts during a third time period.

16. The method of claim 15, wherein the second time period follows the second time.

17. The method of claim 15, wherein the third time period follows the third time.

* * * * *

UNITED STATES PATENT AND TRADEMARK OFFICE
CERTIFICATE OF CORRECTION

PATENT NO.         : 8,183,814 B2
APPLICATION NO.    : 12/508093
DATED              : May 22, 2012
INVENTOR(S)        : Ewald Franz Fuchs It is certified that error appears in the above-identified patent and that said Letters Patent is hereby corrected as shown below:

In column 10, line 34, delete " $\zeta_s$ " and insert -- $\varsigma_s$ --.

In column 11, line 7, delete " $T_{rated}=T_{rated}^{p1}=T_{rated}^{p2}$ " and insert -- $T_{rated} = T_{rated}^{p1} = T_{rated}^{p2}$ --.

In column 11, line 12, delete " $n_{base}=n_{ms}^{p1} \approx n_{m\_rated}^{p1}$ " and insert -- $n_{base} = n_{ms}^{p1} \approx n_{m\_rated}^{p1}$ --.

In column 12, line 67, delete " $I_{max\_start}^{8-poles}$ is 15 A " and insert -- $I_{max\_startup}^{8-poles}$ is 15 A --.

In column 13, line 1, delete " $T_{startup}^{8-poles} = 11 \cdot T_{rated\_4-poles}$ " and insert -- $T_{startup}^{8-poles} = 11 \cdot T_{rated\_4poles}$ --.

In column 13, line 7, delete " $N_{0=Nrated}$ " and insert -- $N_0 = N_{rated}$ --.

In column 13, line 8, delete " $I_{max\_steady-state}^{4-poles} = 1.4$ A " and insert -- $I_{max\_steady-state}^{4-poles} = 1.4$ A --.

In column 13, line 9, delete " $I_{max\_startup}^{8-poles} = 15$ A. " and insert -- $I_{max\_startup}^{8-poles} = 15$ A. --.

In column 13, line 10, delete " $I_{max\_startup}^{8-poles}/I_{max\_steady-state}^{4-poles} = 15/1.4 \approx 11$ , " and insert -- $I_{max\_startup}^{8-poles}/I_{max\_steady-state}^{4-poles} = 15/1.4 \approx 11$ --.

In column 13, line 46, delete " $B_{max}|_{3.5s\_(N_0/2)} = 73$ T, " and insert -- $B_{max}|_{3.5s\_(N_0/2)} = 0.73$ T. --.

Signed and Sealed this
Thirtieth Day of October, 2012

David J. Kappos
*Director of the United States Patent and Trademark Office*

CERTIFICATE OF CORRECTION (continued)
U.S. Pat. No. 8,183,814 B2

In column 13, line 47, delete "$T|_{3.5s} = 1.33 \cdot T_{rated}^{4-poles}$" and insert -- $T|_{3.5s} = 1.33 \cdot T_{rated}^{4-poles}$ --.

In column 13, line 54, delete "$P_{out}^{4-poles\_(N_o/2)}|_{3.5s} = 2 \cdot P_{rated\_4poles}$," and insert -- $P_{out}^{4-poles\_(N_O/2)}|_{3.5s} = 2 \cdot P_{rated\_4poles}$, --.

In column 14, line 2, delete "$P_{out}^{4-poles\_(N_o/2)}|_{4.5s} = 2 \cdot P_{rated\_4poles}$," and insert -- $P_{out}^{4-poles\_(N_O/2)}|_{4.5s} = 2 \cdot P_{rated\_4poles}$, --.

In column 14, line 31, delete "$T_{6000rpm}^{4-poles} = 0.5 \cdot T_{rated\_4poles} \cdot$" and insert -- $T_{6000rpm}^{4-poles} = 0.5 \cdot T_{rated\_4poles} \cdot$ --.

In column 14, line 32, delete "$8 \cdot n_{base} = 4 \cdot n_{rated}^{4-poles} = 6,000$ rpm," and insert -- $8 \cdot n_{base} = 4 \cdot n_{rated}^{4-poles} = 6,000$ rpm --.

In column 14, lines 33 and 34, delete "$P_{out\_6,000rpm}^{4-poles\_(N_0/2)} = (4.0 \cdot 0.5 \cdot 0.27/0.55) \cdot P_{rated\_4poles} \approx P_{rated\_4poles} \cdot$" and insert -- $P_{out\_6,000rpm}^{4-poles\_(N_0/2)} = (4.0 \cdot 0.5 \cdot 0.27/0.55) \cdot P_{rated\_4poles} \approx P_{rated\_4poles} \cdot$ --.

In column 14, line 59, delete "VDC." and insert --$V_{DC}$.--.